(12) United States Patent
Caron

(10) Patent No.: US 9,174,525 B2
(45) Date of Patent: Nov. 3, 2015

(54) HYBRID ELECTRIC VEHICLE

(71) Applicant: FAIRFIELD MANUFACTURING COMPANY, INC., Lafayette, IN (US)

(72) Inventor: LaVerne Andrew Caron, Kalamazoo, MI (US)

(73) Assignee: FAIRFIELD MANUFACTURING COMPANY, INC., Lafayette, IN (US)

( * ) Notice: Subject to any disclaimer, the term of this patent is extended or adjusted under 35 U.S.C. 154(b) by 126 days.

(21) Appl. No.: 14/038,740

(22) Filed: Sep. 26, 2013

(65) Prior Publication Data
US 2014/0244082 A1    Aug. 28, 2014

Related U.S. Application Data

(60) Provisional application No. 61/769,092, filed on Feb. 25, 2013.

(51) Int. Cl.
*B60L 11/00* (2006.01)
*B60K 6/46* (2007.10)
(Continued)

(52) U.S. Cl.
CPC ............. *B60K 6/46* (2013.01); *B60L 11/005* (2013.01); *B60W 10/06* (2013.01); *B60W 10/08* (2013.01); *B60W 20/108* (2013.01); *H02P 9/00* (2013.01); *B60W 2600/00* (2013.01); (Continued)

(58) Field of Classification Search
CPC ....... B60L 11/005; B60K 6/46; B60W 10/06; B60W 10/08; B60W 2600/00; B60W 20/108; Y02T 10/648; Y02T 10/7022; H02P 9/00; Y10S 903/93
See application file for complete search history.

(56) References Cited

U.S. PATENT DOCUMENTS 3,517,766 A * 6/1970 West .................... 180/65.245
3,934,362 A    1/1976 Hyler
(Continued)

FOREIGN PATENT DOCUMENTS

EP    2518858 A2    10/2012

OTHER PUBLICATIONS

Cross, Patrick Wilson, System Modeling and Energy Management Strategy Development for Series Hybrid Vehicles, A Thesis Presented to Academic Faculty, Aug. 2008, p. 1-133, Georgia Institute of Technology.
(Continued)

*Primary Examiner* — Mary Cheung
*Assistant Examiner* — Rodney Butler
(74) *Attorney, Agent, or Firm* — Woodling, Krost and Rust

(57) ABSTRACT

A hybrid electric vehicle includes a high voltage DC bus and an internal combustion engine. The internal combustion engine is mechanically coupled to a non self-excited generator/motor which is preferably a switched reluctance machine. A power inverter electrically and bidirectionally couples the high voltage DC bus to the non self-excited switched reluctance generator/motor. Front and rear axle dual DC-AC inverters electrically and bidirectionally couple two traction AC non self-excited switched reluctance motors/gear reducers to the high voltage DC bus for moving the vehicle and for regenerating power. An ultracapacitor coupled to the high voltage DC bus. A bidirectional DC-DC converter interposed between a low voltage battery and the high voltage DC bus transfers energy to the high voltage DC bus and ultracapacitor to ensure that the non self-excited switched reluctance generator/motor operating in the motor mode is able to start the engine.

16 Claims, 16 Drawing Sheets

(51) Int. Cl.
  *H02P 9/00* (2006.01)
  *B60W 10/06* (2006.01)
  *B60W 10/08* (2006.01)
  *B60W 20/00* (2006.01)

(52) U.S. Cl.
  CPC ........... *Y02T 10/648* (2013.01); *Y02T 10/7022* (2013.01); *Y10S 903/93* (2013.01)

(56) References Cited

U.S. PATENT DOCUMENTS

| | | | |
|---|---|---|---|
| 4,135,592 A | 1/1979 | Wincent | |
| 4,245,714 A | 1/1981 | Kersey | |
| 4,809,805 A | 3/1989 | Short | |
| 5,039,129 A | 8/1991 | Balmer | |
| 5,335,739 A | 8/1994 | Pieterse et al. | |
| 5,373,195 A | 12/1994 | De Doncker et al. | |
| 5,589,743 A | 12/1996 | King | |
| 5,705,918 A | 1/1998 | Davis | |
| 5,710,699 A | 1/1998 | King et al. | |
| 5,723,956 A | 3/1998 | King et al. | |
| 5,939,848 A | 8/1999 | Yano et al. | |
| 6,062,335 A | 5/2000 | Renger et al. | |
| 6,138,784 A | 10/2000 | Oshima et al. | |
| 6,140,780 A | 10/2000 | Oshima et al. | |
| 6,233,935 B1 | 5/2001 | Kahlon et al. | |
| 6,326,763 B1 | 12/2001 | King et al. | |
| 6,330,498 B2 | 12/2001 | Tamagawa | |
| 6,364,042 B1 | 4/2002 | Joachim | |
| 6,380,701 B1 | 4/2002 | Kahlon et al. | |
| 6,460,643 B1 | 10/2002 | Degelman | |
| 6,484,830 B1 | 11/2002 | Gruenwald et al. | |
| 6,591,758 B2 | 7/2003 | Kumar | |
| 6,637,134 B2 | 10/2003 | Hammerle | |
| 6,648,086 B1 | 11/2003 | Schulte | |
| 6,651,759 B1 | 11/2003 | Gruenwald et al. | |
| 6,683,389 B2 | 1/2004 | Geis | |
| 6,827,164 B2 | 12/2004 | Palumbo et al. | |
| 6,876,098 B1 | 4/2005 | Gray, Jr. | |
| 6,885,920 B2 | 4/2005 | Yakes et al. | |
| 6,894,402 B2 | 5/2005 | Dubus et al. | |
| 7,004,273 B1 | 2/2006 | Gruenwald et al. | |
| 7,012,822 B2 | 3/2006 | Zhu et al. | |
| 7,078,877 B2 | 7/2006 | Salasoo et al. | |
| 7,085,112 B2 | 8/2006 | Wilk et al. | |
| 7,109,686 B2 | 9/2006 | Schulte et al. | |
| 7,117,962 B2 | 10/2006 | Moffett et al. | |
| 7,119,454 B1 | 10/2006 | Chiao | |
| 7,190,133 B2 | 3/2007 | King et al. | |
| 7,218,489 B2 | 5/2007 | Wilk et al. | |
| 7,252,165 B1 | 8/2007 | Gruenwald et al. | |
| 7,258,183 B2 | 8/2007 | Leonardi et al. | |
| 7,277,782 B2 | 10/2007 | Yakes et al. | |
| 7,391,129 B2 | 6/2008 | Chiao et al. | |
| 7,394,229 B2 | 7/2008 | Lim et al. | |
| 7,411,312 B2 | 8/2008 | Chiao | |
| 7,451,993 B2 | 11/2008 | Zanini | |
| 7,459,888 B2 | 12/2008 | Schulte et al. | |
| 7,489,048 B2 | 2/2009 | King et al. | |
| 7,489,093 B2 | 2/2009 | King et al. | |
| 7,492,055 B2 | 2/2009 | Chiao | |
| 7,568,537 B2 | 8/2009 | King | |
| 7,595,597 B2 | 9/2009 | King et al. | |
| 7,628,236 B1 | 12/2009 | Brown | |
| 7,630,181 B2 | 12/2009 | Wilk et al. | |
| 7,633,271 B2 | 12/2009 | Schulte et al. | |
| 7,657,350 B2 | 2/2010 | Moran | |
| 7,657,351 B2 | 2/2010 | Moran | |
| 7,658,247 B2 | 2/2010 | Carter | |
| 7,680,568 B2 | 3/2010 | Moran | |
| 7,683,569 B2 | 3/2010 | Bloomfield | |
| 7,689,330 B2 | 3/2010 | Moran | |
| 7,689,331 B2 | 3/2010 | Moran | |
| 7,690,457 B2 | 4/2010 | Nakanowatari | |
| 7,694,772 B1 | 4/2010 | Doll | |
| 7,711,460 B2 | 5/2010 | Yakes et al. | |
| 7,736,117 B2 | 6/2010 | Harshberger et al. | |
| 7,743,869 B2 | 6/2010 | Flournoy, Jr. et al. | |
| 7,745,953 B2 | 6/2010 | Puccetti et al. | |
| 7,764,496 B2 | 7/2010 | Nguyen et al. | |
| 7,780,562 B2 | 8/2010 | King et al. | |
| 7,786,616 B2 | 8/2010 | Naden et al. | |
| 7,795,839 B2 | 9/2010 | Bloomfield | |
| 7,808,214 B2 | 10/2010 | Bartilson | |
| 7,808,771 B2 | 10/2010 | Nguyen et al. | |
| 7,825,530 B2 | 11/2010 | Schulte et al. | |
| 7,854,282 B2 | 12/2010 | Lee et al. | |
| 7,859,202 B2 | 12/2010 | Lukic et al. | |
| 7,862,943 B2 | 1/2011 | Hortop et al. | |
| 7,866,425 B2 | 1/2011 | King et al. | |
| 7,870,916 B2 | 1/2011 | Carter | |
| 7,872,856 B2 | 1/2011 | Nguyen et al. | |
| 7,916,453 B2 | 3/2011 | Nguyen et al. | |
| 7,921,945 B2 | 4/2011 | Harris | |
| 7,928,598 B2 | 4/2011 | King et al. | |
| 7,932,633 B2 | 4/2011 | King et al. | |
| 7,936,083 B2 | 5/2011 | Stancu et al. | |
| 7,949,447 B2 | 5/2011 | Demong et al. | |
| 7,960,855 B2 | 6/2011 | King et al. | |
| 7,960,857 B2 | 6/2011 | King | |
| 7,987,934 B2 | 8/2011 | Huseman | |
| 7,990,117 B2 | 8/2011 | Benedict | |
| 7,992,662 B2 | 8/2011 | King et al. | |
| 8,001,906 B2 | 8/2011 | King et al. | |
| 8,002,056 B2 | 8/2011 | Chakrabarti et al. | |
| 8,013,548 B2 | 9/2011 | King et al. | |
| 8,026,638 B2 | 9/2011 | King et al. | |
| 8,026,691 B2 | 9/2011 | Nagashima et al. | |
| 8,027,759 B2 | 9/2011 | Saeki et al. | |
| 8,030,884 B2 | 10/2011 | King et al. | |
| 8,046,134 B2 | 10/2011 | Huang et al. | |
| 8,063,609 B2 | 11/2011 | Salasoo et al. | |
| 8,080,973 B2 | 12/2011 | King et al. | |
| 8,115,334 B2 | 2/2012 | Vyas et al. | |
| 8,120,290 B2 | 2/2012 | King | |
| 8,122,985 B2 | 2/2012 | Nagashima et al. | |
| 8,134,333 B2 | 3/2012 | Elder et al. | |
| 8,134,343 B2 | 3/2012 | Like et al. | |
| 8,145,355 B2 | 3/2012 | Danko | |
| 8,148,952 B2 | 4/2012 | Schaffnit | |
| 8,154,149 B2 | 4/2012 | King | |
| 8,159,083 B2 | 4/2012 | Ogorman et al. | |
| 8,193,761 B1 | 6/2012 | Singh | |
| 8,195,367 B2 | 6/2012 | Kim et al. | |
| 8,242,739 B2 | 8/2012 | Krauer et al. | |
| 8,245,801 B2 | 8/2012 | Flett | |
| 8,274,173 B2 | 9/2012 | King et al. | |
| 8,294,297 B2 | 10/2012 | Linkhart et al. | |
| 2002/0144848 A1 | 10/2002 | Schulte | |
| 2006/0162988 A1 | 7/2006 | Ivantysynova et al. | |
| 2007/0132204 A1 | 6/2007 | Sewell | |
| 2007/0158118 A1 | 7/2007 | King | |
| 2007/0164693 A1 | 7/2007 | King et al. | |
| 2007/0246636 A1* | 10/2007 | Katayama et al. | 248/637 |
| 2008/0068801 A1 | 3/2008 | Wilk | |
| 2008/0174174 A1 | 7/2008 | Burns et al. | |
| 2009/0033274 A1* | 2/2009 | Perisic et al. | 318/771 |
| 2009/0056661 A1 | 3/2009 | Cook et al. | |
| 2009/0080126 A1 | 3/2009 | Wilk et al. | |
| 2009/0190273 A1 | 7/2009 | Moran et al. | |
| 2009/0209381 A1* | 8/2009 | Ai et al. | 475/5 |
| 2009/0250269 A1 | 10/2009 | Goodwin et al. | |
| 2010/0039054 A1 | 2/2010 | Young et al. | |
| 2010/0090525 A1 | 4/2010 | King et al. | |
| 2010/0096926 A1 | 4/2010 | King et al. | |
| 2010/0097031 A1 | 4/2010 | King et al. | |
| 2010/0133025 A1 | 6/2010 | Flett | |
| 2010/0133029 A1 | 6/2010 | Moran et al. | |
| 2010/0133900 A1 | 6/2010 | King | |
| 2010/0138064 A1 | 6/2010 | Wilk et al. | |
| 2010/0138089 A1 | 6/2010 | James | |
| 2010/0145562 A1* | 6/2010 | Moran | 701/22 |
| 2010/0157527 A1 | 6/2010 | Medina | |
| 2010/0187031 A1 | 7/2010 | Waszak et al. | |

(56) References Cited

U.S. PATENT DOCUMENTS

| | | | |
|---|---|---|---|
| 2010/0187905 A1* | 7/2010 | Tang | 307/10.1 |
| 2010/0253145 A1 | 10/2010 | King et al. | |
| 2010/0276993 A1 | 11/2010 | King | |
| 2010/0305792 A1 | 12/2010 | Wilk et al. | |
| 2011/0011659 A1* | 1/2011 | Sailor et al. | 180/65.245 |
| 2011/0035109 A1 | 2/2011 | Ryerson et al. | |
| 2011/0037320 A1 | 2/2011 | King et al. | |
| 2011/0041723 A1* | 2/2011 | Kumar | 105/35 |
| 2011/0048827 A1* | 3/2011 | Cherney et al. | 180/65.245 |
| 2011/0100735 A1* | 5/2011 | Flett | 180/65.22 |
| 2011/0120787 A1 | 5/2011 | Lee et al. | |
| 2011/0144840 A1 | 6/2011 | Ye et al. | |
| 2011/0184598 A1 | 7/2011 | Bloomfield | |
| 2011/0221387 A1 | 9/2011 | Steigerwald et al. | |
| 2012/0038214 A1 | 2/2012 | King et al. | |
| 2012/0038215 A1 | 2/2012 | Berry et al. | |
| 2012/0038216 A1 | 2/2012 | Berry et al. | |
| 2012/0074774 A1 | 3/2012 | King et al. | |
| 2012/0112693 A1 | 5/2012 | Kusch et al. | |
| 2012/0112702 A1 | 5/2012 | Steigerwald et al. | |
| 2012/0126728 A1 | 5/2012 | El-Refaie et al. | |
| 2012/0126733 A1 | 5/2012 | El-Refaie et al. | |
| 2012/0126741 A1 | 5/2012 | El-Refaie et al. | |
| 2012/0153878 A1 | 6/2012 | King et al. | |
| 2012/0153879 A1 | 6/2012 | King et al. | |
| 2012/0168242 A1 | 7/2012 | Kulatunga | |
| 2012/0187753 A1 | 7/2012 | Schaffnit | |
| 2012/0195087 A1 | 8/2012 | Kroeze et al. | |
| 2012/0211286 A1 | 8/2012 | Samuel | |
| 2012/0245772 A1 | 9/2012 | King | |
| 2013/0032416 A1* | 2/2013 | Gouker et al. | 180/65.31 |

OTHER PUBLICATIONS

Dudzinski et al, Dynamic Stability of Machines With Articulated Frame Steering in Automatic Warning System Aspect, Division of Machinery Design and Automation, Faculty of Mechanical Engineering, Technical University of Wroclaw, Poland, Automation and Robotics in Construction XII, Copyright 1995, pp. 299-306.

Hrabovcova et al, Output Power of Switched Reluctance Generator With Regard to the Phase Numer and Number of Stator and Rotor Poles, Electrical Engineering, T 190, Electronics and Electrical Engineering, 2011, No. 3(109), ISSN 1392-1215, p. 25-30.

Nidec Drives Ltd., Nidec Motor Corporation, http://www.srdrives.com/technology.shtml, Copyright 2012.

Huntley et al, Articulation in Machinery, Power Point Presentation, AGM 206, pp. 1-5, Date: at Least as Early as Sep. 26, 2013.

Darie et al, Advantages of Using a Switched Reluctance Generator (SRG) for Wind Energy Applications, pp. 1-8, Date: at Least as Early as Sep. 26, 2013.

Office Action in Canadian Patent Application No. 2843355, Filing Date: Feb. 20, 2014; Hybrid Electric Vehicle, Feb. 13, 2015, pp. 1-4, Applicant Fairfield Manufacturing Company, Inventor: Caron, Laverne Andrew.

English Translation and Original of Office Action in Korean Patent Application No. 10-2014-0021172, Filing Date Feb. 14, 2014, Hybrid Electric Vehicle, Jan. 27, 2015, pp. 1-7, Applicant Fairfield Manufacturing Company, Inventor: Caron, Laverne Andrew.

\* cited by examiner

— 100H

- COLD PLATE
- DC-LINK CAPACITOR BANK
- BUS BARS
- HOUSING
- HIGH VOLTAGE CONNECTOR AND WIRING
- LOW VOLTAGE ELECTRONICS

FIG. 1H

HYBRID ELECTRIC VEHICLE

This application claims the benefit of and priority to provisional patent application Ser. No. 61/769,092 filed Feb. 25, 2013.

FIELD OF THE INVENTION

The invention is in the field of hybrid electric vehicles.

BACKGROUND OF THE INVENTION

Hybrid electric vehicle technology improves the efficiency of all types of vehicles. Wheel loaders, front end loaders, excavators, combines, sprayers and utility vehicles of all types require improved environmental and financial efficiency.

SUMMARY OF THE INVENTION

The wheel loader is a series electric hybrid employing four AC non self-excited switched reluctance traction motors/generators which propel the vehicle and which regenerate power from the kinetic and potential energy of the wheel loader. Alternatively, just one traction motor/generator can be used and it does not necessarily have to be a switched reluctance traction motor/generator. Further, the wheel loader includes a non self-excited switched reluctance generator/motor which provides primary power to the wheel loader for operation of the wheel loader. An ultracapacitor bank is used to store regenerative energy since the amounts of energy involved are modest but the number of cycles is very high (4 to 8 cycles per minute.)

Switched reluctance (SR) technology is preferably used for the AC traction motors because of their wide constant power range, benign failure modes, low cost, robustness, and design flexibility. For the same reasons, it is desirable to preferably employ switched reluctance (SR) technology for the generator/motor which supplies primary power to the machine. However, unlike IPM generators, SR (switched reluctance) generators are not self-exciting. This is desirable as a fault tolerance feature but must be addressed for the system to function properly. Some initial amount of electrical power must be supplied to initiate power generation in the switched reluctance generator or the system will not operate/generate. If a system contains a high-voltage battery pack it could be used to provide the excitation energy necessary for the switched reluctance generator. However, in the case of ultracapacitors there are conditions where sufficient energy will not be available, for example, at initial installation, and after service or after periods of long shutdown.

Regardless of the generator technology used, it would be desirable to make use of the generator to start the internal combustion engine. This simplifies the system by eliminating the starter and related solenoids and wiring. It also makes start-stop operation practical since the typical DC brush-type starter motor, solenoid and ring gear are not designed for the large number of cycles needed for start-stop operation. The switched reluctance generator/motor is a large machine relative to a conventional starter and can provide higher cranking torques and speeds. Full-time coupling is also desirable since there is no need to manage pinion-ring gear engagement.

The ultracapacitor bank can be used to provide the energy for engine starting. However, there are times, for example upon initial installation, when the ultracapacitor bank may be discharged. It is not practical to directly "jump start" the ultracapacitor bank since very high voltage is necessary (>500 Volts).

The solution (for SR excitation and for cranking) is to provide a moderately low power (e.g. 5 kW) DC-DC converter to transfer energy from the vehicle 12 or 24-volt batteries to the ultracapacitor bank. If the 12 or 24-volt batteries are discharged, "jump starting" can be applied at the 12 or 24-volt system. Another advantage of this approach is that relatively low levels of power over a longer period of time can be used to handle the energy transfer. So in cases where a weak battery cannot provide sufficient power to crank the engine, it can provide enough power to charge the ultracapacitor bank to a level that will easily crank the engine. This approach also provides the mechanism for pre-charging both the ultracapacitor bank and the power inverter DC-link capacitor banks without need for the typical arrangement of contactors and current limiting pre-charge resistors.

Since one or two minutes may be required to charge the ultracapacitor bank at the cited low power level this method for starting the vehicle is not preferable and should only be used under adverse circumstances. The solution is to assure that, under normal circumstances, the ultracapacitor bank is fully charged prior to shut down. A fully charged capacitor bank will generally retain sufficient charge for starting for several weeks.

For a conventional vehicle, the 24-volt battery is kept charged by an alternator. Alternators are relatively inexpensive but are inefficient and have poor reliability. The need for an alternator can be eliminated by making the DC-DC converter bi-directional so that energy is transferred from the DC Link to the 24-volt system to maintain its state of charge. This helps justify the use of the DC-DC converter which will spend the majority of its life charging the 24-volt system and only upon rare occasions transferring energy to charge the ultracapacitor bank.

The invention includes an energy balancing process for off-highway applications. The invention maintains the total hybrid system energy constant at a level equal to the maximum energy storage capacity of the ultracapacitor bank. For example, the total system energy equals the actual ultracapacitor energy plus the recoverable kinetic energy in the vehicle plus recoverable accessory energy.

With the internal combustion engine and the non self-excited switched reluctance motor/generator operating in the generator mode, then: if the kinetic energy in the vehicle is low (vehicle not moving) and the potential energy in the hydraulic system is low (bucket down), then the ultracapacitor bank should be charged to the maximum; and, if there is recoverable energy in the vehicle the state of charge in the ultracapacitor bank should be depleted to the extent necessary that this energy can be recovered in the future. In other words, the actual ultracapacitor energy due to the primary energy source, generator, equals the ultracapacitor energy maximum capacity minus the vehicle kinetic energy minus recoverable hydraulic energy (accessory energy).

$$\text{Recoverable vehicle kinetic energy} = \left(\frac{1}{2}mV^2\right) - \text{rolling resistance loss.}$$

Recoverable hydraulic energy=mgH where, m is the bucket mass, g is the acceleration of gravity, and H is the bucket height.

Using this strategy, the actual energy level maintained in the ultracapacitor bank will be related to the negative of the vehicle speed squared. When the internal combustion engine is not running, and with the vehicle not moving, the DC-DC converter maintains the ultracapacitor bank state of charge at a level that will assure that the engine can be started when necessary.

The energy level required in the ultracapacitor bank for starting the engine is inferred based on the engine coolant temperature, ranging from approximately 14 kJ for a warm engine to 200 kJ for a cold engine. The available energy in the two type 31 (95 AHr) 24 VDC batteries is approximately 7 MJ. An ultracapacitor bank using 1200 Farad capacitors at 800 VDC stores about 1.3 MJ of energy which is more than sufficient to start a cold internal combustion engine. Only about 700 kJ of the stored 1.3 MJ can be used as the voltage on the common high voltage DC bus drops below 500 VDC after 700 kJ is used. 500 VDC is approximately the lowest voltage at which the inverters are operable.

A hybrid electric vehicle includes a high voltage DC bus and an internal combustion engine. The internal combustion engine is mechanically coupled to a non self-excited generator/motor which is preferably a switched reluctance machine. A power inverter electrically and bidirectionally couples the high voltage DC bus to the non self-excited switched reluctance generator/motor. Front and rear axle dual DC-AC inverters electrically and bidirectionally couple two traction AC non self-excited switched reluctance generators/motors/gear reducers to the high voltage DC bus for moving the vehicle and for regenerating power. An ultracapacitor is coupled to the high voltage DC bus. As used herein the term ultracapacitor and ultracapacitor bank mean the same thing and the terms are interchangeable. A bidirectional DC-DC converter interposed between a low voltage battery and the high voltage DC bus transfers energy to the high voltage DC bus and ultracapacitor to ensure that the non self-excited switched reluctance generator/motor operating in the motor mode is able to start the internal combustion engine.

A series-electric hybrid vehicle includes a non self-excited generator/motor for providing power to the vehicle for propulsion and operation thereof and a high voltage DC bus. Preferably the non self-excited generator/motor is a switched reluctance generator/motor operable in either the generator or the motor mode. A plurality of wheels propel the vehicle. One or more non self-excited AC traction motors/generators propel the vehicle. One or more compact dual inverters convey power bi-directionally between the high voltage DC bus and the one or more non self-excited AC traction motors/generators which are affixed, respectively, to one or more of the plurality of wheels. The compact dual inverters associated with the non self-excited AC traction motors/generators are configured to operate in a generator mode or in a motor mode. The non self-excited AC traction motors/generators are configured in combination with the wheels to provide propulsion and regenerative braking. Preferably the non self-excited AC traction motors generators/motors are switched reluctance generators/motors operable in either the generator or the motor mode. An internal combustion engine is coupled to the non self-excited generator/motor for providing power to the vehicle for propulsion and operation thereof. The non self-exciting generator/motor is coupled to a power inverter. The power inverter supplies power bidirectionally to and from the high voltage DC bus. The inverter also supplies power to the high voltage DC bus when the non self-excited generator/motor operates in the generator mode, and, the inverter supplies power to the non self-excited generator/motor when the non self-excited generator/motor operates in the motor mode. An ultracapacitor bank is electrically coupled to the high voltage DC bus. The ultracapacitor bank stores regenerative energy from the non self-excited AC traction motors when operating in the motor mode, and, the ultracapacitor bank supplies energy to the inverter coupled to the non self-excited generator/motor operating in the motor mode for starting the engine. The series electric hybrid vehicle also includes a conventional low voltage system with at least one 12 or 24 volt DC battery. A bidirectional DC-DC converter is used to convey power between the 12 or 24 volt DC battery and the ultracapacitor bank for purposes of pre-charging the ultracapacitor bank to start the internal combustion engine and to maintain the state of charge of the 12 or 24 volt battery after the engine is started. Optionally, the series-electric hybrid vehicle includes a resistor bank wherein the resistor bank dissipates excess regenerative energy from the non self-excited AC traction generators/motors operating in the generator mode. Still further, optionally, the series-electric hybrid vehicle includes a non self-excited generator/motor operating in the generator mode to dissipate excess kinetic energy from the vehicle by back driving the internal combustion engine while operating an engine compression brake. In the series-electric hybrid vehicle the non self-exciting generator/motor is the primary source of electrical energy for the vehicle.

Another example of the invention includes a hybrid electric vehicle comprising a high voltage DC bus and an internal combustion engine. Preferably the non self-excited generator/motor is a switched reluctance generator/motor operable in either the generator or the motor mode. The internal combustion engine drives a non self-excited generator/motor supplying energy to the high voltage DC bus. A rear axle compact bidirectional dual DC-AC inverter drives two AC traction motors/generators/gear reducers for moving the vehicle and for recapturing energy from regenerative braking. A front axle compact bidirectional dual DC-AC inverter drives two AC traction motors/generators/gear reducers for moving the vehicle and for recapturing energy from regenerative braking. An ultracapacitor is electrically coupled to the high voltage DC bus. A bidirectional DC-DC converter is interposed between a 12 or 24-volt battery and the high voltage DC bus. The DC-DC converter transfers energy between the 12 or 24-volt DC battery and the high voltage DC bus and the ultracapacitor. A non self-excited generator/motor is coupled mechanically to the engine for starting the internal combustion engine. Preferably the non self-excited generator/motor is a switched reluctance machine. The ultracapacitor supplies energy to the inverter coupled to the generator for starting the internal combustion engine. Optionally, this example of the hybrid electric vehicle includes a resistor bank and the compact dual bidirectional DC-AC inverters include rectification means for regenerating energy and storing the energy in the battery and/or the ultracapacitor.

Another example of the hybrid electric vehicle includes a high voltage DC bus and an internal combustion engine. The internal combustion engine is mechanically coupled to a non self-excited switched reluctance motor/generator. The non self-excited switched reluctance motor/generator operates as a generator supplying electrical power in a generator mode. The non self-excited switched reluctance motor/generator operates as a motor receiving electrical power in a motor mode. The non self-excited switched reluctance generator/motor is coupled to a power inverter. The inverter bi-directionally conveys power between the high voltage DC bus and the non self-excited switched reluctance generator/motor. A first front AC traction motor/generator drives a first front wheel and the first front traction motor/generator is a non self-excited switched reluctance motor/generator. The first front AC traction motor/generator provides propulsion and/or regenerative braking. A second front AC traction motor drives a second front wheel. The second front traction motor/generator is a non self-excited switched reluctance motor/generator. The second front traction motor/generator provides propulsion and/or regenerative braking. A first rear AC traction motor/generator drives a first rear wheel. The first rear traction motor/generator is a non self-excited switched reluctance motor/generator. The first rear traction motor/generator provides propulsion and/or regenerative braking. A second rear AC traction motor/generator drives a second rear wheel. The second rear traction motor/generator is a non self-excited switched reluctance motor/generator. The second rear traction motor/generator provides propulsion and/or regenerative braking. A first compact dual inverter and a second compact dual inverter are included in this example. The first compact dual inverter is in electrical communication with the high voltage DC bus. The first compact dual inverter converts DC power from the high voltage DC bus into AC power for driving the first front AC traction motor/generator and the first front wheel. The first compact dual inverter converts DC power from the high voltage DC bus into AC power for driving the second front AC traction motor/generator and the second front wheel. The second compact dual inverter is in electrical communication with the high voltage DC bus. The second compact dual inverter converts DC power from the high voltage DC bus into AC power for driving the first rear AC traction motor/generator and the first rear wheel. The second compact dual inverter converts DC power from the high voltage DC bus into AC power for driving the second rear AC traction motor/generator and the second rear wheel. An ultracapacitor bank is electrically coupled to the high voltage DC bus. The ultracapacitor bank stores regenerative energy from the first compact dual inverter supplied by the first and second front AC traction motors/generators operating in a regenerative mode. The ultracapacitor bank stores regenerative energy from the second compact dual inverter supplied by the first and second rear AC traction motors/generators operating in a regenerative mode. The ultracapacitor bank stores energy from the power inverter coupled to the non self-excited switched reluctance generator/motor when the non self-excited switched reluctance generator/motor is operating in the generator mode. The ultracapacitor bank supplies energy to the power inverter coupled to the non self-excited switched reluctance generator/motor when the non self-excited switched reluctance generator/motor is operating in the motor mode to start the internal combustion engine. A conventional low voltage system with at least one 12 or 24 volt battery is used in conjunction with a bidirectional DC-DC converter. The bidirectional DC-DC converter steps the voltage of the battery up and conveys power between the 12 or 24 volt battery and the ultracapacitor bank to pre-charge the ultracapacitor bank to start the internal combustion engine. The bidirectional DC-DC converter steps the voltage of the high voltage DC bus down to maintain the state of charge of the 12 or 24 volt battery after the internal combustion engine is started. Optionally, the hybrid electric vehicle includes a resistor bank. The resistor bank dissipates excess regenerative energy from the non self-excited AC traction generators/motors operating in the generator mode. Still further, optionally, the motor/generator operating in the motor mode is used to dissipate excess kinetic energy from the vehicle by back driving the engine while operating an engine compression brake. In this example of a hybrid electric vehicle the switched reluctance non self-exciting generator/motor electrically coupled to the power inverter is the primary source of electrical energy for the vehicle.

Another example of the invention is set forth as a hybrid electric system, comprising: an internal combustion engine and a non self-exciting AC generator/motor. The non self-exciting AC generator/motor operates in either a generator mode or a motor mode. An ultracapacitor bank is connected full time across the high voltage DC bus. An AC-DC inverter converts the AC power from the non self-exciting AC generator/motor to DC power for supply to the high voltage DC bus and the ultracapacitor bank. Means for charging the ultracapacitor bank from a conventional low-voltage vehicle DC battery to provide initial excitation energy to the non self-exciting generator/motor operating in the motor mode are provided to start the internal combustion engine. The ultracapacitor bank is charged with sufficient energy from the low voltage battery such that the non self-excited generator/motor can be used in the motor modes to start the engine thus replacing the conventional low-voltage engine starter. The means used to charge the ultracapacitor is a bi-directional DC-DC converter which maintains the state of charge of the low-voltage battery thus eliminating the need for a conventional low-voltage alternator. Further, in this example of the invention, dual compact inverters are used. A plurality of non self-excited traction generators/motors each interconnected with a respective one of a plurality of wheels is provided. Alternatively, a single non self-excited traction generator/motor interconnected with one wheel may be used. Except for bicycles and motorcycles, single wheel drives aren't too practical. The point of a design with a single traction motor would be to use a traditional axle with a differential to provide torque to at least two wheel ends.

The dual compact inverters are connected across the ultracapacitor bank. The dual compact inverters are bidirectional DC-AC inverters and, the dual compact inverters transfer energy to and from the ultracapacitor bank and to and from the non self-excited traction generators/motors. Optionally, in this example of the invention, the non self-excited generator/motor is operated in the motor mode to back drive the internal combustion engine and an associated engine brake in order to dissipate excessive regenerative braking energy. In this example of the invention, the non self-excited generator/motor is a switched reluctance machine. Different type of generators/motors may be used other than the non self-excited generator/motor. Still further in this example of a hybrid electric system the ultracapacitor bank is driven to a predetermined maximum state of charge prior to engine shutdown in order to provide for rapid engine starting without need to rely on pre-charging from the vehicle low-voltage DC battery under normal operating conditions. Still further in this example of the hybrid electric system the dual compact inverters may optionally discharge some of the energy in the ultracapacitor bank into the windings of the non self-excited traction generators/motors without motion either by operating at sufficiently low enough power to avoid motion or by operating the non self-excited traction generators/motors with opposing torques.

Another example of the invention includes a hybrid electric vehicle having a controller, a non self-excited generator/motor mechanically interconnected with the internal combustion engine, a power inverter, and the non self-excited generator/motor in electrical communication with the power inverter. The non self-excited generator/motor is operable in a generator mode or a motor mode. An ultracapacitor is interconnected with the high voltage DC bus and the controller controls the power inverter. The ultracapacitor bank is charged to a usable operating voltage by transferring energy from a low voltage battery by use of a DC-DC converter. The non self-excited generator/motor is controlled by the controller and driven in the motor mode by the power inverter when the ultracapacitor is charged to a usable voltage to start the internal combustion engine. Further, a plurality of non self-excited traction generators/motors driven by the first and second dual compact inverters are included in the instant example of the invention. The first and second compact inverters are controlled by the controller. The power inverter may supply power bidirectionally. Further, the first and second dual compact inverters may supply power bidirectionally.

The DC-DC converter is a 4-port device. Two of the lines are connected (full time) in parallel across the 12/24 volt batteries and the other two lines are connected (full time) across the high voltage bus. Like an alternator, the DC-DC converter is a current device. In response to commands from the vehicle control unit (controller) it takes current from one of the voltage sources and delivers it to the opposite voltage source. In this example, there are 8 switches. No more than four switches should ever be turned on simultaneously (or damage will result). In standby mode all of the switches will be off.

The control of the traction motors is strictly in response to the driver requirements for traction or braking, without regard to system energy or DC-Link voltage, with the following exceptions: 1) The associated inverters are not capable of operating below some minimum voltage (e.g. 500V) so the motors will cease operating if this occurs; 2) The ultracapacitor bank and power inverters will suffer damage if the DC-Link voltage exceeds 900 volts, so delivery of regenerated energy must be halted at some upper voltage limit.

The hybrid controller will control the generator inverter to provide current to the DC-Link bus such that: 1) The DC-link voltage stays above the minimum inverter operating voltage; 2) The ultracapacitor bank voltage is kept as high as possible (short of the 900V limit with a safety margin) provided it retains sufficient storage capability to recapture any kinetic or potential energy currently stored in the vehicle. That is because a higher DC-link voltage results in lower system currents, and thus lower losses; hence better system efficiency; 3) The ultracapacitor bank is fully charged prior to engine shutdown so that, even if the ultracapacitors discharge over time, they will likely retain sufficient energy to restart the engine.

A method for controlling a hybrid electric vehicle includes setting the maximum permissible energy content of the ultracapacitor bank and setting the minimum high voltage DC bus voltage and then determining if there is sufficient energy in an ultracapacitor bank to start an internal combustion engine. The method also includes transferring energy using a DC-DC converter from a low voltage DC battery to the ultracapacitor bank if there is not sufficient energy in the ultracapacitor bank to start the internal combustion engine. Further the method includes starting the internal combustion engine using a non self-excited generator/motor operating in a motor mode to start the internal combustion engine if there is sufficient energy in the ultracapacitor bank. Additional steps of the method require calculating recoverable energy in the hybrid electric vehicle and calculating energy in the ultracapacitor bank of the hybrid electric vehicle. Once the calculations are determined, the method requires determining if the calculated recoverable energy plus the ultracapacitor energy is less than a maximum permissible energy content of the ultracapacitor bank.

The method further requires commanding the internal combustion engine to idle and commanding zero power generation from the non self-excited generator/motor operating in a generator mode if the calculated recoverable energy plus the ultracapacitor energy is not less than the maximum permissible energy content of the ultracapacitor bank and waiting a period of time while the internal combustion engine is idling with zero power generation from the non self-excited generator/motor operating in the generator mode and recalculating the calculated recoverable energy plus the ultracapacitor energy and redetermining if the calculated recoverable energy plus the ultracapacitor energy is less than a maximum permissible energy content of the ultracapacitor bank due to consumption of energy by the hybrid electric vehicle and if the recalculated recoverable energy plus the ultracapacitor energy is not less than a maximum permissible energy content of the ultracapacitor bank, then shutting down the internal combustion engine. Still further the method requires setting the internal combustion engine speed to the best brake specific fuel consumption speed and commanding maximum power from the non self-excited generator/motor operating in a generator mode if the calculated recoverable energy plus the ultracapacitor energy is less than the maximum permissible energy content of the ultracapacitor bank. The method further includes determining if a brake command is present and sending a negative torque command to the non self-excited traction motors proportional to the brake command and within stability limits if the brake command is present. The method further requires determining if the high voltage DC bus voltage is greater than the high voltage DC bus minimum voltage if the brake command is not present.

Next, the method requires sending a zero torque command to the non self-excited traction generators/motors if the high voltage DC bus voltage is not greater than the high voltage DC bus minimum voltage and monitoring an accelerator command if the high voltage DC bus is greater than the high voltage DC bus minimum voltage. Still further, the method requires determining if the vehicle speed is less than the maximum permissible speed and sending a zero torque command to the non self-excited traction generators/motors if vehicle speed is not less than the maximum permissible speed and sending a positive torque command proportional to the accelerator signal within stability limits to the non self-excited traction generators/motor if the shift selector is in forward gear. Next, the method requires sending a negative torque command proportional to the accelerator signal within stability limits to the non self-excited traction generators/motors if the shift selector is not in forward gear. Still further, the method prefers that the non self-excited traction generators/motors are switched reluctance machines. Still further, the method requires controlling a hybrid electric vehicle wherein the non self-excited generator/motor which starts the internal combustion engine is preferably a switched reluctance machine. Optionally, the method for controlling the hybrid electric vehicle includes wherein the step of commanding the internal combustion engine to idle and commanding zero power generation from the non self-excited generator/motor operating in a generator mode if the calculated recoverable energy plus the ultracapacitor energy is not less than the maximum permissible energy content of the ultracapacitor bank and waiting a period of time while the internal combustion engine is idling with zero power generation from the non self-excited generator/motor operating in the generator mode and recalculating the calculated recoverable energy plus the ultracapacitor energy and redetermining if the calculated recoverable energy plus the ultracapacitor energy is less than a maximum permissible energy content of the ultracapacitor bank due to consumption of energy by the hybrid electric vehicle and if the recalculated recoverable energy plus the ultracapacitor energy is not less than a maximum permissible energy content of the ultracapacitor bank, then shutting down the internal combustion engine is performed.

Still further, the method for controlling a hybrid electric vehicle wherein the step of commanding the internal combustion engine to idle and commanding zero power generation from the non self-excited generator/motor operating in a generator mode if the calculated recoverable energy plus the ultracapacitor energy is not less than the maximum permissible energy content of the ultracapacitor bank and waiting a period of time while the internal combustion engine is idling with zero power generation from the non self-excited generator/motor operating in the generator mode and recalculating the calculated recoverable energy plus the ultracapacitor energy and redetermining if the calculated recoverable energy plus the ultracapacitor energy is less than a maximum permissible energy content of the ultracapacitor bank due to consumption of energy by the hybrid electric vehicle and if the recalculated recoverable energy plus the ultracapacitor energy is not less than a maximum permissible energy content of the ultracapacitor bank, then shutting down the internal combustion engine is performed in conjunction with the dual compact inverters discharging some of the energy in the ultracapacitor bank into windings of the non self-excited traction generators/motors without motion either by operating at sufficiently low enough power to avoid motion or by operating the non self-excited traction generators/motors with opposing torques.

Still further, the method for controlling a hybrid electric vehicle optionally includes driving the ultracapacitor bank to a predetermined maximum state of charge prior to shutdown of the internal combustion engine for rapid engine starting without need to rely on pre-charging from the vehicle low-voltage DC battery.

In cases of a severe fault condition or for service and maintenance it may be necessary to rapidly discharge the energy storage devices so personnel are not exposed to hazardous voltages. A simple way to dissipate energy in an e-machine is to continuously pulse a single phase only. The EM field would align the poles associated with that phase and the rotor would simply remain in place with no mechanical movement. To better spread the energy between phases, activation (pulsing) all of the phases simultaneously is done. In this case one phase is trying to produce forward motion, one is trying to produce reverse motion and the third is trying to hold the rotor in place. A good deal of power is being used but nothing is moving. This may appear to be severe operation for the motors and inverter but it would be for very short periods of time. As an example, if the Ultracapacitor bank is fully charged, to 1.2 MJ and 2.5 kW is dissipated in each of the 4 traction motors, then it is possible to discharge the Ultacapacitor bank in approximately 1.2 MJ/(4×2500 J-Sec)=120 Sec=2-minutes. At their continuous rating of 45 kW and 95% efficiency, each motor normally dissipates 2.27 kW into its cooling jacket. The motors are also rated to dissipate 3.25 kW for 1-minute if a slightly faster discharge is required. The generator can be used in the same manner.

The non-self-exciting generator, ultracapacitor bank and bi-directional DC-DC converter can be used with a single traction motor driving conventional, differential equipped axles. It does not technically matter what type of electric machine the traction motors are, provided the machines meet torque, power and speed requirements. They may be self-exciting (e.g. IPM motors) or non-self-exciting and A/C or DC. Whenever the traction motors operate as generators the vehicle is already moving. Therefore there is plenty of energy available somewhere in the system to provide excitation energy if necessary.

One reason that non-self-exciting traction motors are attractive is that they have a very wide constant power band and are, therefore, more likely to meet the required performance specifications. Motors that employ magnets, in an effective manner, generate more and more back EMF as speed increases and this prevents them from achieving higher speeds unless some sort of field weakening is used. Permanent magnet motors also have unattractive failure modes and are less flexible to deal with in manufacturing and service than ACI and SR machines.

It is an object of the invention to use the dual compact inverters to discharge some of the energy in the ultracapacitor bank into the windings of the non self-excited traction generators/motors without motion either by operating at sufficiently low enough power to avoid motion or by operating the non self-excited traction generators/motors with opposing torques.

It is a further object of the invention to use a non self-excited switched reluctance generator/motor operating in the motor mode in combination with a bidirectional power inverter to provide the primary electrical energy source to the hybrid electric vehicle.

It is a further object of the invention to use a plurality of traction AC non self-excited switched reluctance generators/motors operating in the motor mode to provide propulsion for the wheels of the hybrid electric vehicle.

It is a further object of the invention to use a plurality of traction AC non self-excited switched reluctance generators/motors operating in the generator mode and, in conjunction, with front and rear compact dual axle inverters, to provide regeneration of electric power from the kinetic energy stored in the moving hybrid electric vehicle.

It is a further object of the invention to provide an ultracapacitor which receives energy from a low voltage battery in combination with a DC-DC converter when the voltage across the ultracapacitor is too low for starting of the internal combustion engine.

It is a further object of the invention to provide charging means for the low voltage battery.

It is a further object of the invention to provide a DC-DC converter to step down the voltage from the high voltage DC bus to the battery voltage level.

It is a further object of the invention to control the voltage of the high voltage DC bus above a minimum voltage level.

It is a further object of the invention to provide the ultracapacitor bank with the ability to store regenerated energy by calculating the recoverable energy in the vehicle and by calculating the energy in the ultracapacitor to keep the combined total energy less than the desired capacity of the ultracapacitor.

It is a further object of the invention to provide the ultracapacitor bank with the ability to store regenerated energy by calculating the recoverable energy in the vehicle and by calculating the energy in the ultracapacitor and controlling the amount of energy in the ultracapacitor due to the non self-excited switched reluctance generator/motor operating in the motor mode in combination with a bidirectional power inverter.

It is a further object of the invention to provide the ultracapacitor bank with the ability to store regenerated energy by controlling the amount of energy in the ultracapacitor due to the non self-excited switched reluctance generator/motor operating in the motor mode in combination with a bidirectional power inverter.

It is a further object of the invention to provide an apparatus and method for using a non self-excited generator/motor as a cranking motor for systems without high voltage battery packs.

It is a further object of the invention to provide an apparatus and method for using a non self-excited switched reluctance generator/motor as a cranking motor for systems without high voltage battery packs.

It is a further object of the invention to provide a hybrid electric vehicle which has the ability to start the internal combustion engine even though it has been sitting and/or inactive for a long period of time and/or the engine has never been started.

It is a further object of the invention to provide a highly efficient hybrid electric vehicle.

It is a further object of the invention to provide an ultracapacitor and an electric vehicle control system whereby the amount of energy recoverable is stored in the ultracapacitor and the energy attributable to the internal combustion engine is controlled so as to provide enough capacity for the storage of kinetic energy as a function of time.

It is a further object of the invention to provide a control system for the hybrid electric vehicle which accommodates transients (vehicle stability, vibration, speed, acceleration, etc.) in the operation of the vehicle.

It is a further object of the invention to provide a dual compact inverter having a synergistic advantage in that two inverters share the cold plate, a DC-Link capacitor bank, bus bars, housing, high voltage connector and wiring and some of the low voltage electronics.

These and further objects of the invention will be best understood when reference is made to the accompanying drawings, description of the invention and claims which follow hereinbelow.

BRIEF DESCRIPTION OF THE DRAWINGS

FIG. 1H is a schematic illustration of a dual compact inverter having a synergistic advantage in that the inverters are able to share the cold plate, a DC-Link capacitor bank, bus bars, housing, high voltage connector and wiring and some of the low voltage electronics.

DESCRIPTION OF THE INVENTION

Figure 1A:
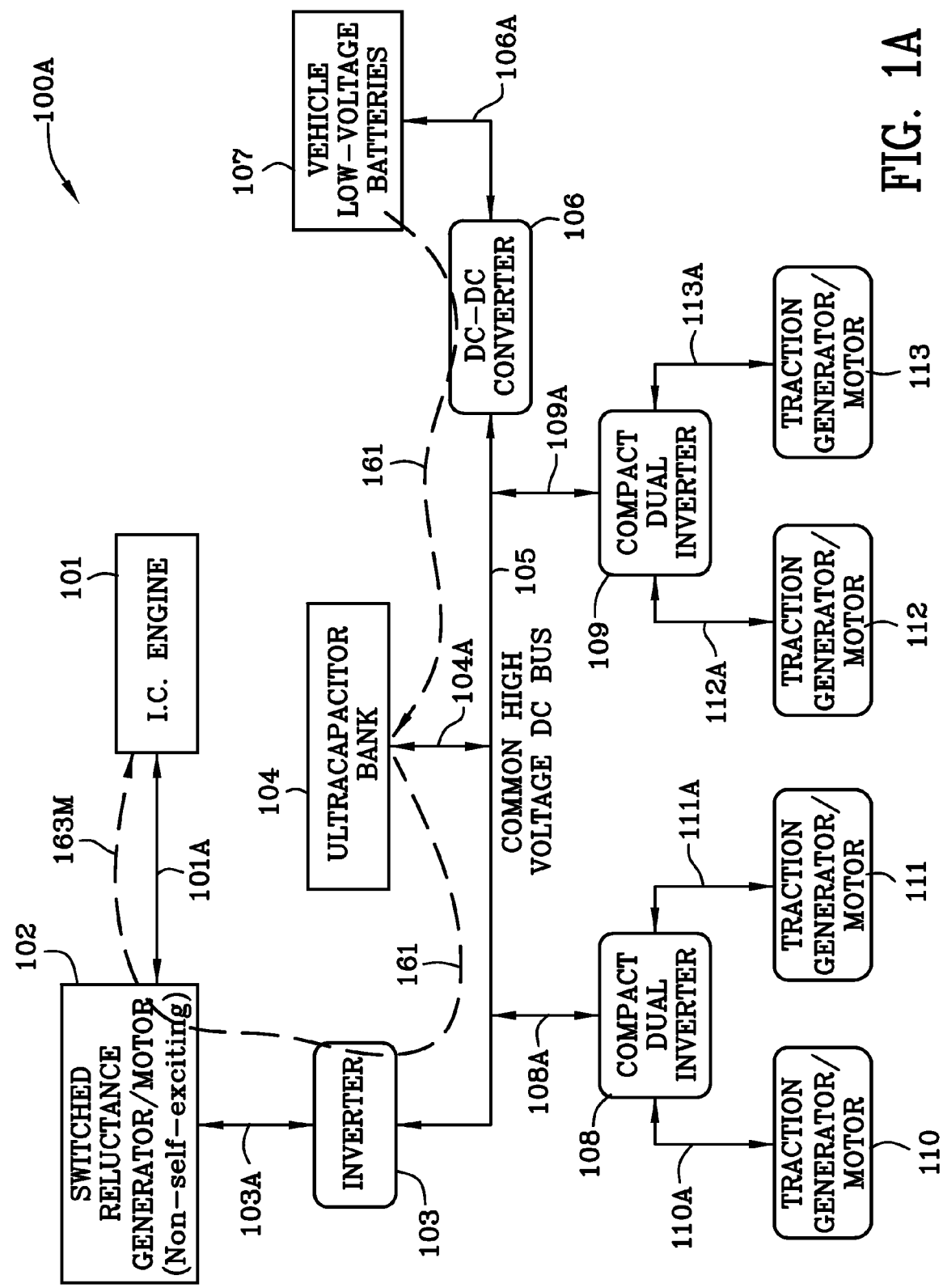
FIG. 1A is schematic illustration of a hybrid electric vehicle illustrating, inter alia, the condition wherein the capacitor is charged from the 24-volt batteries after a prolonged shut-down of the hybrid electric vehicle.

FIG. 1A is schematic illustration 100A of a hybrid electric vehicle illustrating, inter alia, the condition wherein the ultracapacitor bank 104 is charged from the 24-volt batteries 107 after a prolonged shut-down of the hybrid electric vehicle. FIGS. 1A-1H, inclusive, use many of the same reference numerals and they have the same meaning. Once an element is described in connection with a given reference numeral it will generally not be described again in connection with a subsequent drawing figure to avoid repetition. Reference numeral 161 indicates a dashed line illustrating energy flow along path 161 from the low voltage batteries 107 through the DC-DC converter 106 to the ultracapacitor bank 104, the bidirectional power inverter 103, and the non self-excited switched reluctance generator/motor operating in the motor mode and to the internal combustion engine 101. DC-DC converter 106 is capable of handling 5 kW of power. If the ultracapacitor bank is charged to a sufficient energy level as represented by the voltage across the ultracapacitor/high voltage DC bus, then the non self-excited switched reluctance generator/motor operating 102 in the motor mode may be operated so as to protect the low-voltage batteries from an over-current situation. The ultracapacitor bank 104 and the high voltage DC bus are at the same voltage at all times as they are physically connected. The non self-excited switched reluctance generator/motor operating in the motor mode is mechanically coupled to the internal combustion engine 101. Reference numeral 163M is a schematic arrow indicating rotational energy applied to the crank shaft of the internal combustion engine 101 by the switched reluctance generator/motor 102 operating in the motor mode.

Figure 4:
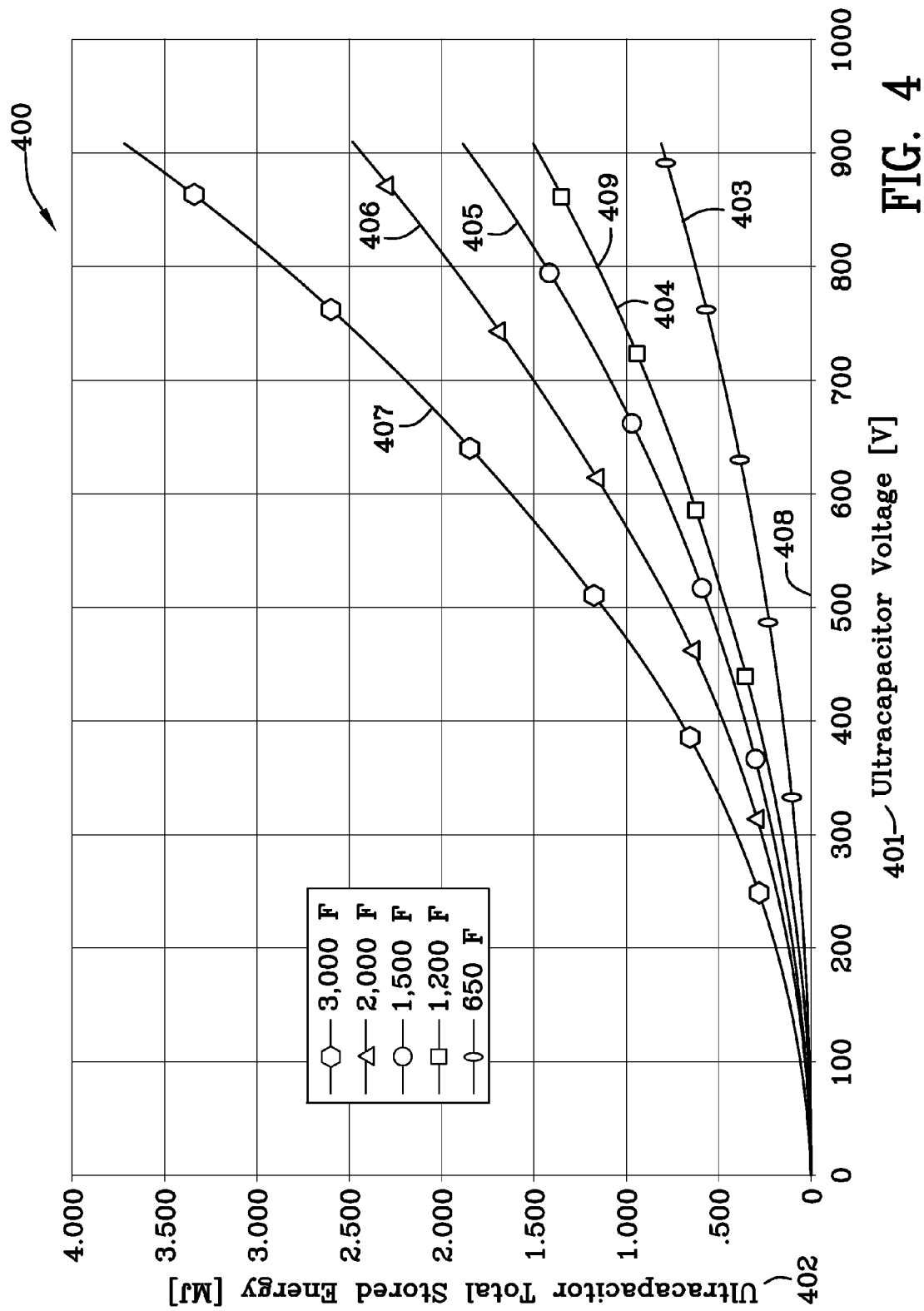
FIG. 4 is a graph illustrating the ultracapacitor voltage versus the ultracapacitor total stored energy.

As used herein the terms "ultracapacitor bank" 104 mean the same as "ultracapacitor" or "ultracapacitor". In the preferred embodiment or example, the ultracapacitors are arranged in series to achieve 1200 Farads of capacitance. Preferably the ultracapacitor bank has an acceptable operational range over which energy is stored. Capacitances in series do not add, rather, capacitances in series are calculated as follows:

It is specifically contemplated that ultracapacitors may be used in parallel, series or in a combination of parallel and series. Further, it is specifically contemplated that capacitances may be in the range of between 1200-3000 F. FIG. 4 is a graph 400 illustrating the ultracapacitor voltage 401 versus the ultracapacitor total stored energy 402. A line representing 650 F of capacitance 403, a line representing 1200 F of capacitance 404, a line representing 1500 F of capacitance 405, a line representing 2000 F of capacitance, and a line representing 3000 F of capacitance are illustrated in FIG. 4. Reference numeral 408 indicates the lower ultracapacitor operational voltage of 500 V DC and reference numeral 409 indicates the upper ultracapacitor operational voltage of 800 V DC.

Still referring to FIG. 1A, a non self-excited switched reluctance generator/motor 102 is illustrated therein along with an internal combustion engine 101. The terms non "self-excited" and non "self-exciting" as used herein mean the same thing. A bidirectional power inverter communicates 103A electrical power to and from the high voltage DC bus 105. The switched reluctance generator/motor 102 produces AC power and the bidirectional inverter 103 converts AC power to DC power and vice-versa. High voltage DC bus 105 is interconnected 104A with ultracapacitor bank 104, DC-DC converter 106, and compact dual inverters 108, 109.

First compact dual inverter 108 drives AC switched reluctance motors/generators 110, 111 which operate in the motor mode for driving the front wheels of the hybrid electric vehicle. First compact dual inverter 108 may also receive energy from the AC switched reluctance traction motors/generators 110, 111 when they operate in the generator mode. Reference numerals 110A, 111A indicate bidirectional power or energy flow between the AC switched reluctance motors/generators 110, 111 and the first compact dual inverter 108. Reference numerals 112A, 113A indicate bidirectional power or energy flow between the AC switched reluctance motors/generators 112, 113 and the second compact dual inverter 109.

Second compact dual inverter 109 drives AC switched reluctance motors/generators 112, 113 operating in the motor mode for driving the rear wheels of the hybrid electric vehicle. Second compact dual inverter 109 may also receive energy from the AC switched reluctance traction motors/generators 112, 113 operating in the generator mode.

Reference numeral 108A illustrates the bidirectional interconnection between the high voltage DC bus 105 and first compact dual inverter 108. Reference numeral 109A illustrates the bidirectional interconnection between the high voltage DC bus 105 and the second compact inverter 109.

Figure 1B:
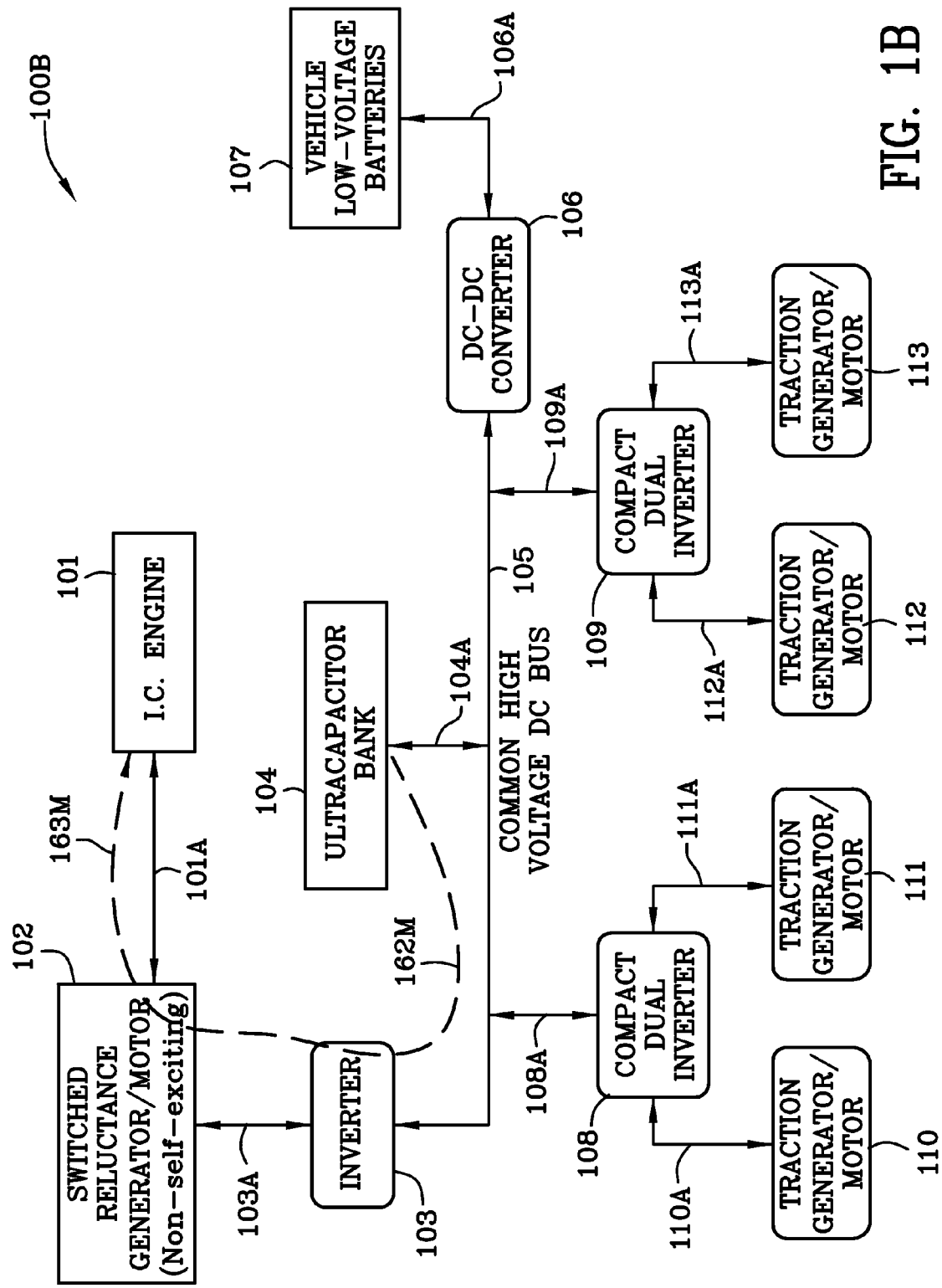
FIG. 1B is a schematic illustration of a hybrid electric vehicle illustrating, inter alia, the condition wherein the capacitor is sufficiently charged and supplying energy to the non self-exciting switched reluctance generator/motor to start the internal combustion engine.

FIG. 1B is a schematic illustration 100B of a hybrid electric vehicle illustrating, inter alia, the condition wherein the capacitor 104 is sufficiently charged and supplying energy to the non self-exciting switched reluctance generator/motor 102 to start the internal combustion engine. Reference numeral 162M is used to identify the charge flow from the ultracapacitor bank 104 to the DC/AC inverter 103 and to the non self-excited switched reluctance generator/motor 102 operating in the motor mode. Reference numeral 163M illustrates a schematic arrow indicating rotational energy applied to the crank shaft of the internal combustion engine 101 by the switched reluctance generator/motor 102 operating in the motor mode.

Figure 1C:
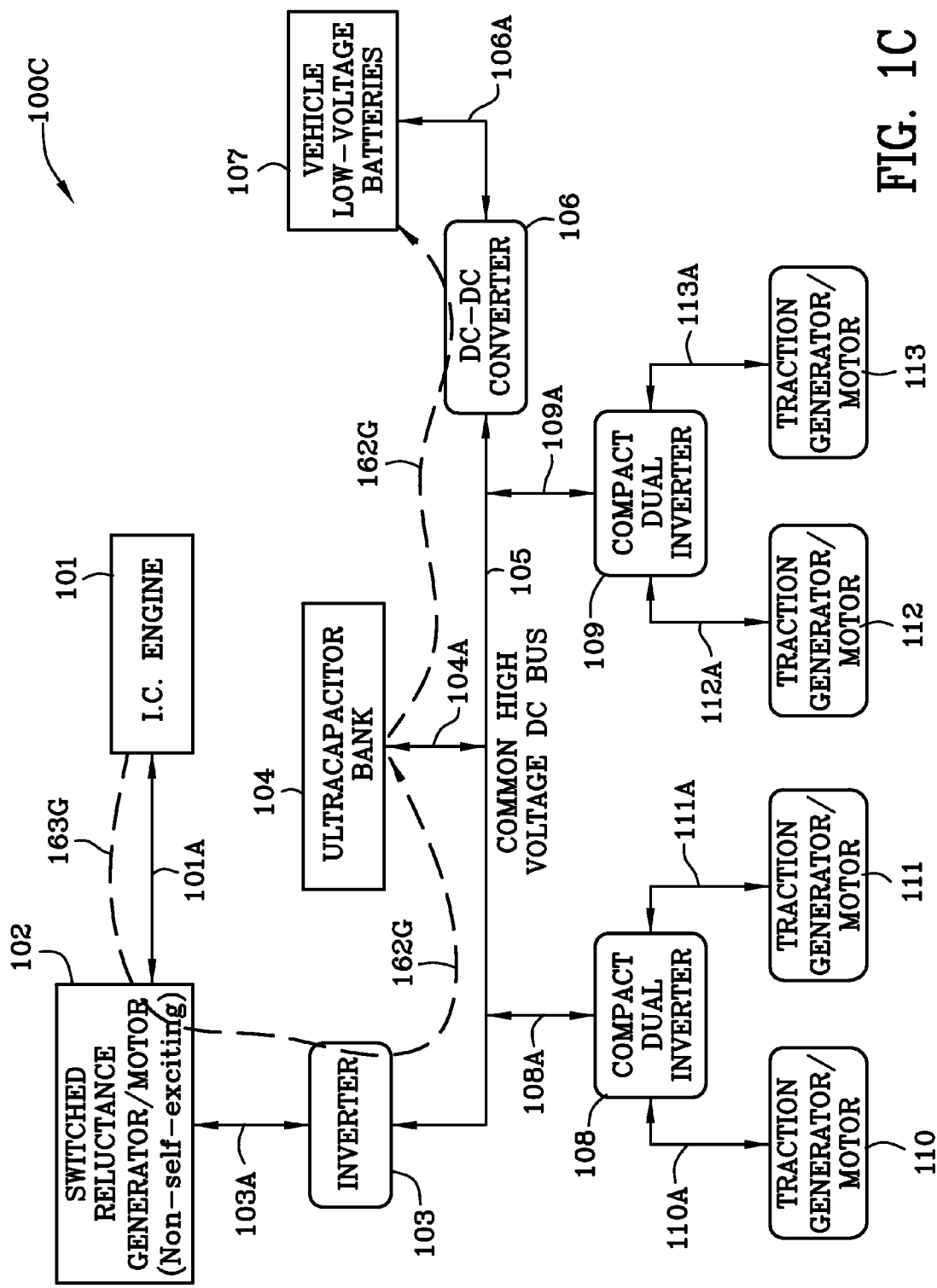
FIG. 1C schematic illustration of a hybrid electric vehicle illustrating, inter alia, the condition wherein the internal combustion engine is supplying power to the non self-exciting switched reluctance generator/motor operating in the generator mode supplying power to the ultra capacitor bank, the DC-DC converter and the 24 volt batteries.
Figure 1D:
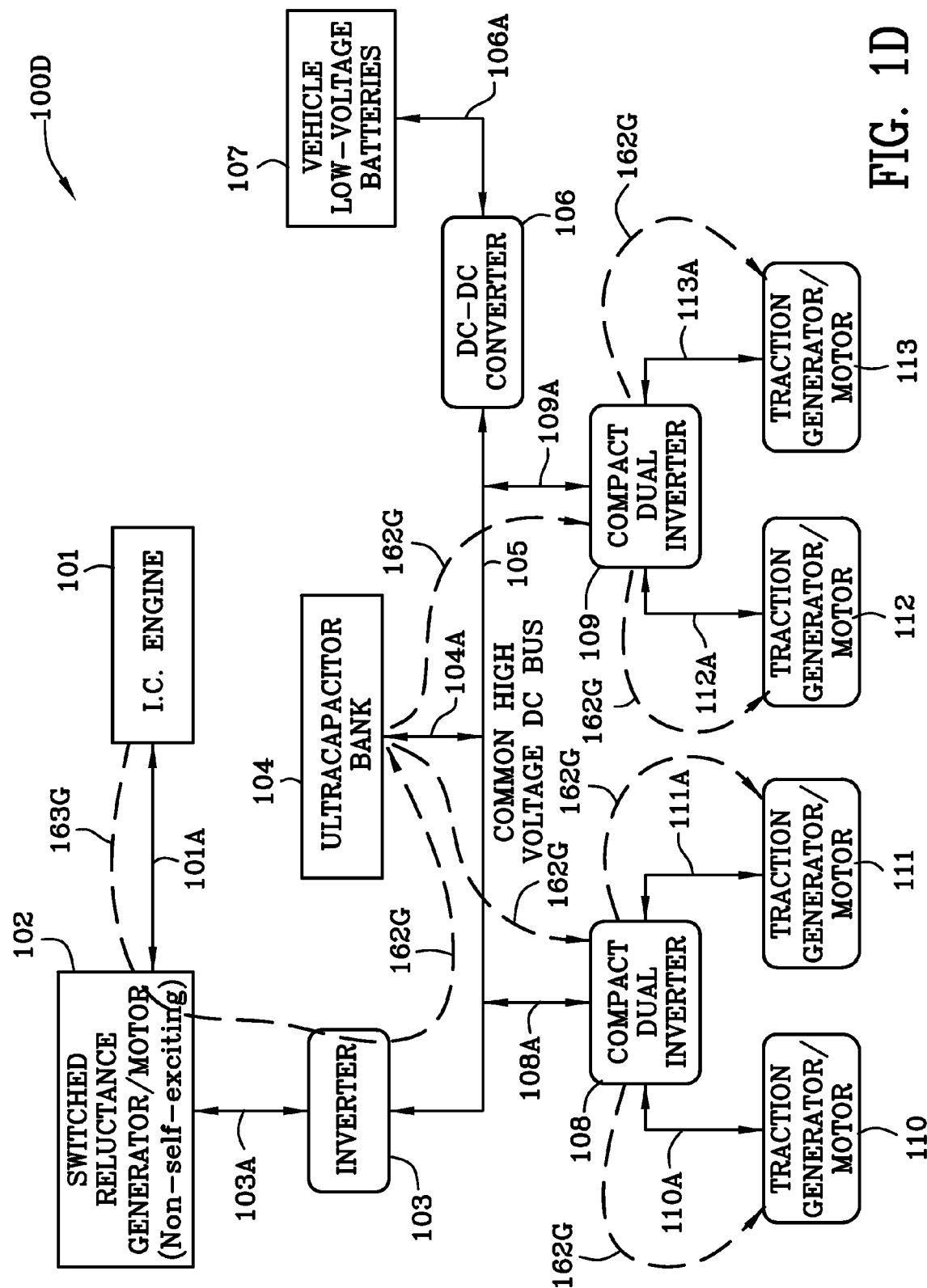
FIG. 1D is a schematic illustration of a hybrid electric vehicle illustrating, inter alia, the condition wherein the internal combustion engine is supplying power to the non self-exciting switched reluctance generator/motor operating in the generator mode which, in turn, is supplying power to the ultra capacitor bank, the dual inverters which supply power to the traction motors, and to the DC-DC converter supplying the low voltage batteries.

FIG. 1C is a schematic illustration 100C of a hybrid electric vehicle illustrating, inter alia, the condition wherein the internal combustion engine 101 is supplying power to the non self-excited switched reluctance generator/motor 102 operating in the generator mode supplying power to the ultracapacitor bank 104, the DC-DC converter 105, and the 24 volt batteries 107. Reference numeral 163G is a schematic arrow indicating rotational energy supplied by the crank shaft of the internal combustion engine 101 to the switched reluctance generator/motor 102 operating in the generator mode. The internal combustion engine 101 may be a 10.8 liter diesel engine. The switched reluctance generator/motor 102 operating in the generator mode may be a 227 kW machine. Reference numeral 162G illustrates charge flow from the non self-exciting switched reluctance generator/motor 102 operating in the generator mode to: the DC/AC inverter 103, the ultracapacitor bank 104, the DC-DC converter 106, the low-voltage batteries 107, the compact dual inverters 108, 109, and the non self-excited traction motors/gear reducers 110, 111, 112, and 113 for driving wheels of the hybrid vehicle. The non self-excited traction motors/gear reducers 110, 111, 112, and 113 for driving wheels of the hybrid vehicle may be 65 kW switched reluctance motors are illustrated schematically in FIG. 1C. See FIG. 1D, a schematic illustration 100D of a hybrid electric vehicle illustrating, inter alia, the condition wherein the internal combustion engine 101 is supplying power to the non self-exciting switched reluctance generator/motor 102 operating in the generator mode which, in turn, is supplying power to the ultra capacitor bank 104, the dual compact inverters 108, 109 which supply power to the non self-exciting AC traction motors/generators 110, 111, 112, 113, and to the DC-DC converter 106 supplying the low voltage batteries 107. Referring to FIG. 1D, reference numeral 162G illustrates the energy flow from the ultracapacitor and/or the high voltage DC bus to the compact dual inverters 108, 109, and to the non self-excited traction generators/motors/gear reducers 110, 111, 112, and 113 for driving wheels of the hybrid vehicle. The non self-excited traction generators/motors/gear reducers are affixed to driving wheels of the hybrid vehicle. Gear reduction is used to convert high-speed, low-torque, power from the traction motors into low-speed, high-torque power at the wheel ends.

Referring to FIG. 1H, dual compact inverter is illustrated which has a synergistic advantage in that two inverters are able to share a cold plate, a DC-Link capacitor bank, bus bars, housing, high voltage connector and wiring and some of the low voltage electronics. This results in saving space and in increased efficiency.

Referring again to FIG. 1D, reference numeral 163G illustrates the mechanical rotational energy flowing from the internal combustion engine generating electrical AC power from the non self-exciting switched reluctance generator/motor 102 whereby it its inverted to DC power by bidirectional power inverter 103. The DC power is then stored in the ultracapacitor bank 104 and/or it is used by the vehicle. If the DC power is used by the vehicle, the compact dual inverters 108, 109 invert the DC power to AC power to operate the non self-exciting AC traction motors/generators 110, 111, 112, 113 and to power the vehicle. Although not specifically illustrated with a dashed line on FIG. 1D, it is also possible that the DC-DC converter is being used to convert the higher voltage of the high voltage DC bus to charge the low voltage DC batteries. It is desired to maintain the high voltage DC bus and the ultacapacitor bank at a voltage between 500-800 VDC.

Figure 1E:
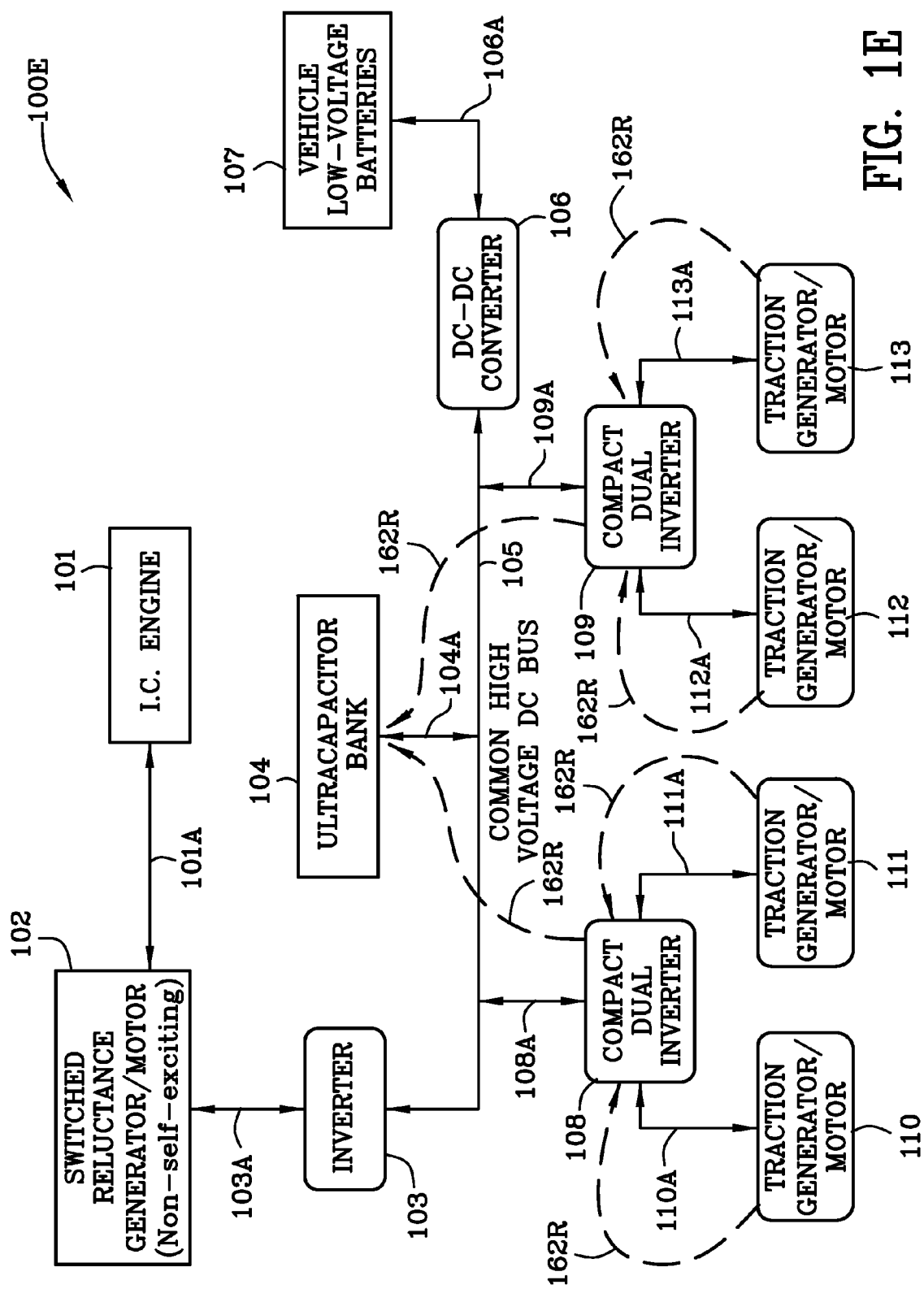
FIG. 1E is a schematic illustration of a hybrid electric vehicle illustrating, inter alia, the condition wherein the regenerative power is being supplied to the ultracapacitor bank, DC-DC converter, and the low-voltage batteries.

FIG. 1E is a schematic illustration 100E of a hybrid electric vehicle illustrating, inter alia, the condition wherein the regenerative power is being supplied to the ultracapacitor bank 104, DC-DC converter 106, and the low-voltage batteries 107. Reference numeral 162R indicates dashed lines which are representative of power flow to the ultracapacitor from the non self-exciting AC traction motors/generators 110, 111, 112, and 113. More specifically, reference numeral 162R indicates charge flow from the non self-exciting switched reluctance generator/motors 110, 111, 112, and 113 acting in the generator mode to the compact dual AC/DC inverters 108, 109, the high voltage DC bus 105, and the ultracapacitor bank 104. As set forth in FIG. 1E, the non self-excited switched reluctance generator/motor 102 may be operating and may be idling.

Figure 2:
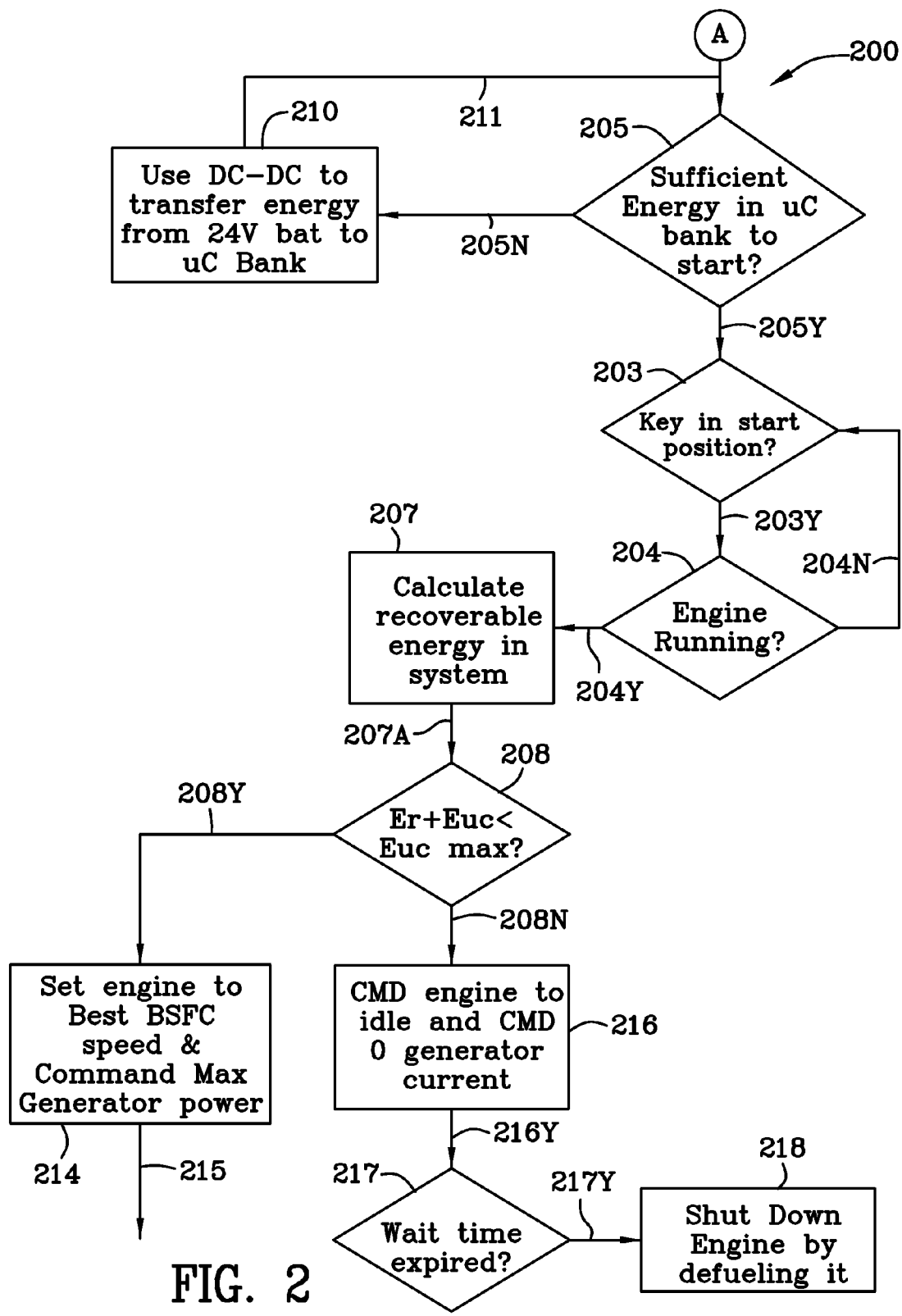
FIGS. 2 and 2A is a schematic of the control strategy of the hybrid electric vehicle.
Figure 2A:
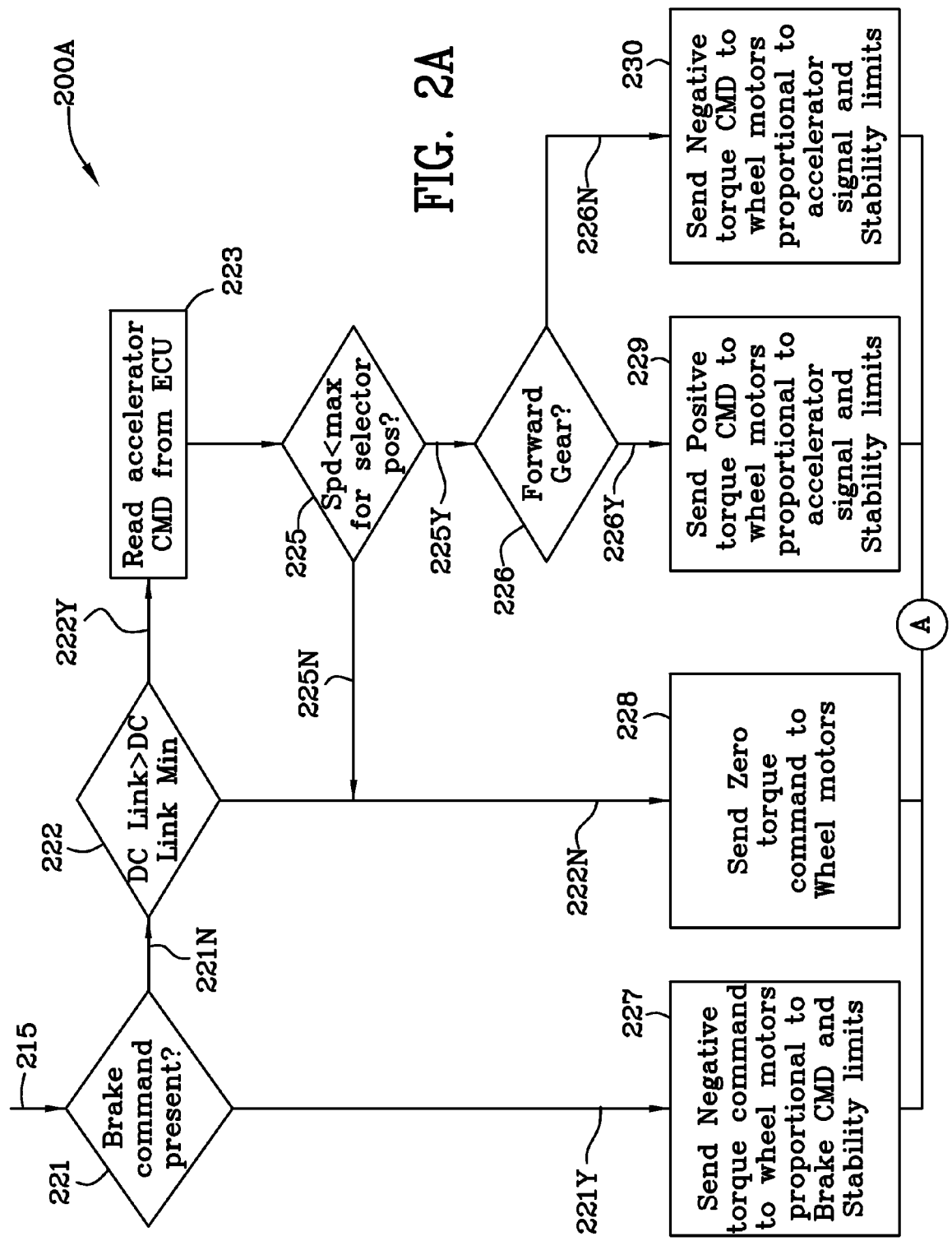
Figure 3:
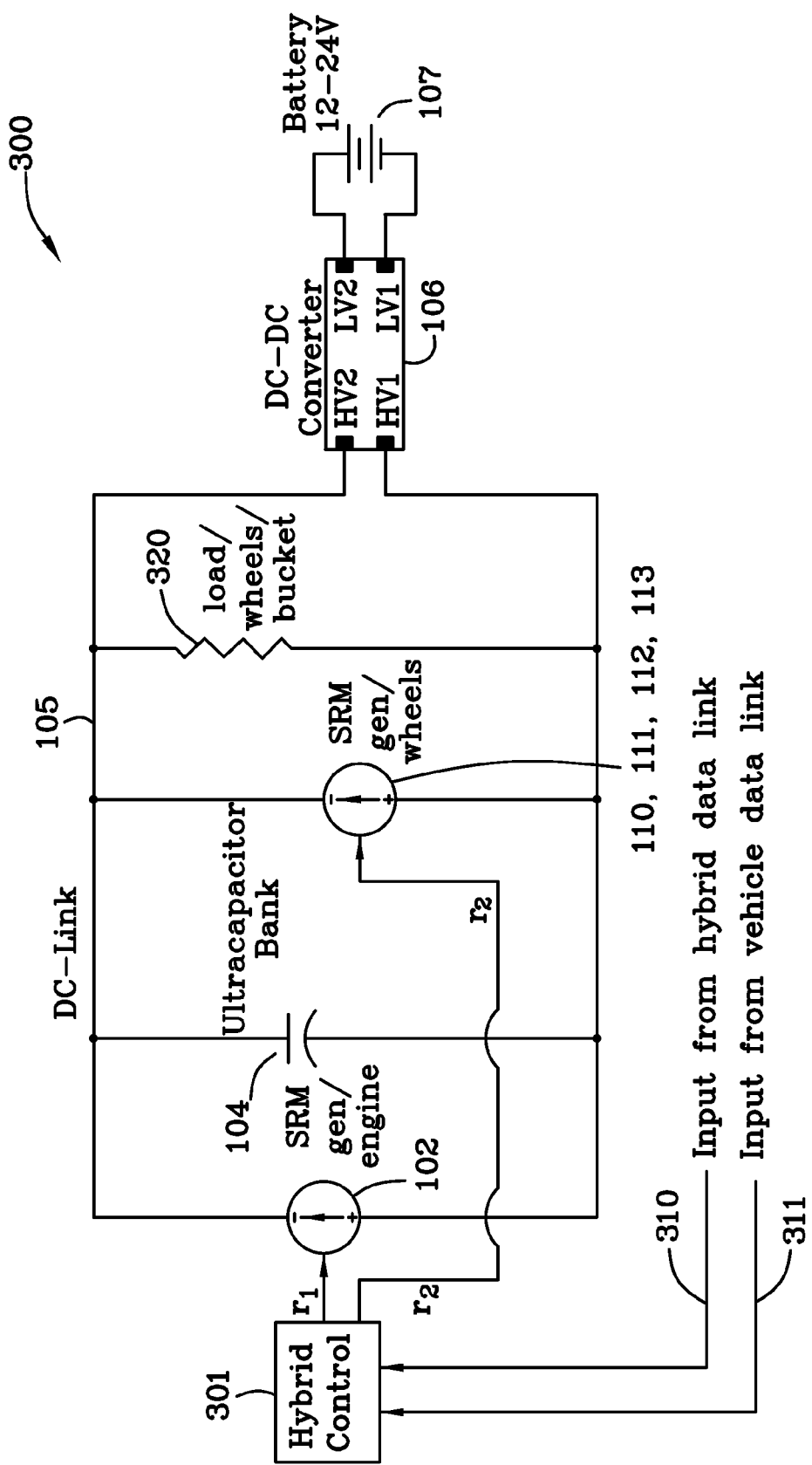
FIG. 3 is an electrical schematic implementing the control strategy of FIGS. 2 and 2A.

Room for regenerative energy storage must be made in the ultracapacitor bank as set forth in FIG. 1E. An electronic controller as set forth in FIG. 3 controls the operation of the hybrid electric vehicle. FIG. 3 is an electrical schematic 300 implementing the control strategy of FIGS. 2 and 2A. FIGS. 2 and 2A is a schematic 200, 200A of the control strategy of the hybrid electric vehicle. Referring to FIG. 2, reference numeral 203 represents the query: is the key in "start" position? The encircled "A" is a terminal representing inputs and outputs to the controller 301 which controls the process of operating the hybrid electric vehicle. The DC-DC converter is a 4-port device. Two of the lines are connected (full time) in parallel across the 12/24 volt batteries and the other two lines are connected (full time) across the high voltage bus. Like an alternator, the DC-DC converter is a current device. In response to commands from the vehicle control unit it takes current from one of the voltage sources and delivers it to the opposite voltage source. In this example, there are 8 switches. No more than four switches should ever be turned on simultaneously (or damage will result). In standby mode all of the switches will be off. The control of the traction motors is strictly in response to the driver requirements for traction or braking, without regard to system energy or DC-Link voltage, with the following exceptions: 1) The associated inverters are not capable of operating below some minimum voltage (e.g. 500V) so the motors will cease operating if this occurs; 2) The ultracapacitor bank and power inverters will suffer damage if the DC-Link voltage exceeds 900 volts, so delivery of regenerated energy must be halted at some upper voltage limit. The hybrid controller will control the generator inverter to provide current to the DC-Link bus such that: 1) The DC-link voltage stays above the minimum inverter operating voltage; 2) The ultracapacitor bank voltage is kept as high as possible (short of the 900V limit with a safety margin) provided it retains sufficient storage capability to recapture any kinetic or potential energy currently stored in the vehicle. That is because a higher DC-link voltage results in lower system currents, and thus lower losses; hence better system efficiency; 3) The ultracapcitor bank is fully charged prior to engine shutdown so that, even if the ultracapacitors discharge over time, they will likely retain sufficient energy to restart the engine.

If the vehicle is not running, the internal combustion engine must be started. The controller queries the energy status of the ultracapacitor bank to determine if there is sufficient energy 205 in the ultracapacitor bank 104 to start the internal combustion engine. If there is not sufficient energy 205 in the ultracapacitor bank 104 to start the engine, then proceed to step 210 and transfer energy (charge) to the ultracapacitor bank 104 to charge it preferably to at least 200V DC. Reference numeral 211 indicates a line indicating communication of energy to the ultracapacitor bank where the query of whether or not there is sufficient energy 205 is again made. More specifically, if there is sufficient energy 205 in the ultracapacitor bank to start the engine, then proceed to step 203 and position the key in the start position. Once the start command has been made, communication 203Y is made with the internal combustion engine to determine if it is running 204. If the internal combustion engine is running 204Y then a calculation is made to determine the recoverable energy in the vehicle 207. If the internal combustion engine is not running 204N, then the key is once again positioned in the start position to attempt to start the internal combustion engine 101.

Once the calculation is made to determine the recoverable energy in the vehicle 207, and communicated 207A to the next step 208, then the controller adds the recoverable energy, Er, to the energy in the ultracapacitor bank to determine if that sum is less than the maximum permissible amount of energy in the ultracapacitor bank 208. If the energy comparison of step 208 satisfies the required inequality, to with, that the recoverable energy of the vehicle, Er, plus the energy presently stored in the ultracapacitor bank, Euc, is less than the maximum permissible energy in the ultracapacitor bank, Euc-max 208Y, then the internal combustion engine 101 is set to the best brake specific fuel consumption and maximum generator 102 power is commanded 214 by the controller.

If the energy comparison of step 208 does not satisfy the required inequality, to with, that the recoverable energy of the vehicle, Er, plus the energy presently stored in the ultracapacitor bank, Euc, is not less that the maximum permissible energy in the ultracapacitor bank, Euc-max, 208N, then the internal combustion engine 101 is commanded to idle and the output of the switched reluctance generator/motor 102 operating in the generator mode is commanded to zero generator current. Then, this condition is communicated 216Y to the controller 216Y and the hybrid electric vehicle burns off (consumes/dissipates) energy stored in the ultracapacitor 104. A wait time 217 is initiated for the energy burn. If the wait time expires 217Y and sufficient energy has not been burned, then the internal combustion engine is shutdown 218. During the wait time, the controller is periodically checking (sampling) the data and making the energy comparison step 208.

Referring to FIG. 2A, when the internal combustion engine 101 is set to the best brake specific fuel consumption and maximum generator 102 power is commanded 214 by the controller, the controller communicates that condition 215 to the next step 235, and the query: is the brake command present 221 is made. The brake command is present when the operator of the vehicle is depressing the brake pedal of the hybrid electric vehicle. If the brake command is present 221Y, then proceed to the next step 227, and send a negative torque command 227 to the non self-exciting switched reluctance generator/motors 110, 111, 112, and 113 acting in the generator mode via the compact dual AC/DC inverters 108, 109.

If the brake command is not present 221, then proceed to the next step 222, is the DC Link voltage>DC Link Min voltage? The DC Link is the high voltage bus 105. If the DC Link voltage is not greater than the DC link Min voltage, then communicate this condition 222N and proceed to the next step 228 and send zero torque command to the switched reluctance generators/motors 110, 111, 112, 113 which drive the vehicle wheels proportional to the accelerator signal and within stability limits. The DC Link voltage is the same thing as the high voltage DC bus.

If the DC Link voltage is greater than the DC link minimum voltage 227Y, then proceed to the next step 223, and read the accelerator command from the electronic controller. Next, the shift selector is read and the query 225 of: is the speed of the vehicle less than the maximum speed for the selector position? If the speed of the vehicle is not less than the maximum speed for the selector position 225N, then proceed to the next step 228 and send zero torque command to the switched reluctance generators/motors 110, 111, 112, 113 which drive the vehicle wheels.

If the speed of the vehicle is less than the maximum speed for the selector position 225Y, then proceed to the next step 226, is the hybrid electric vehicle in forward gear 226? If the vehicle is not in forward gear 226N, then proceed to the next step 230 and send a negative torque command to the switched reluctance generators/motors 110, 111, 112, 113 which drive the vehicle wheels proportional to the accelerator signal and within stability limits to drive the vehicle in the backward (rearward) direction. If the vehicle is in forward gear 226Y, proceed to the next step 229 and send a positive torque command to the switched reluctance generators/motors 110, 111, 112, 113 which drive the vehicle wheels proportional to the accelerator signal and within stability limits to drive the vehicle in the forward direction.

Figure 1F:
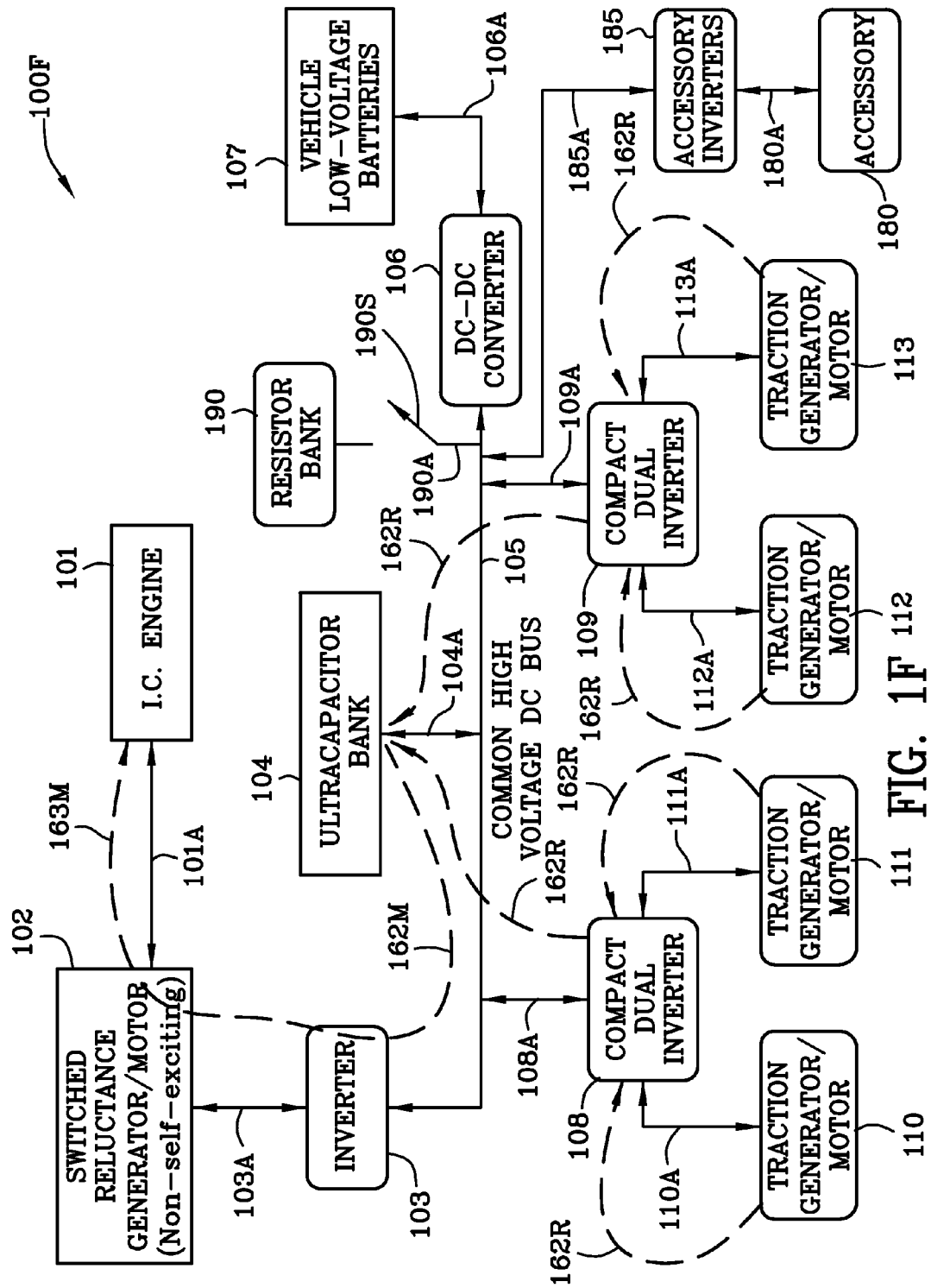
FIG. 1F is a schematic illustration of a hybrid electric vehicle illustrating, inter alia, the condition wherein the regenerative power is being supplied to the ultracapacitor bank and the non self-exciting switched reluctance generator/motor operating in the motor mode.

FIG. 1F is a schematic illustration 100F of a hybrid electric vehicle illustrating, inter alia, the condition wherein the regenerative power 162R is being supplied to the ultracapacitor bank 104 and the non self-exciting switched reluctance generator/motor 102 operating in the motor mode. Reference numeral 162M signifies charge flow from the ultracapacitor bank 104 to the DC-AC power inverter 103 and to the non self-exciting switched reluctance generator/motor 102 operating in the motor mode. Reference numeral 163M is a schematic arrow indicating rotational energy applied to the crank shaft of the internal combustion engine 101 by the switched reluctance generator/motor 102 operating in the motor mode.

FIG. 1F also schematically illustrates a resistor bank 190 switchably 190S interconnected 190A with the high voltage DC bus 105. Resistor bank 190 is optionally included so as to assist with the dissipation of energy if too much is present. Additionally, resistor bank 190 assists with the control and stable operation of the hybrid electric vehicle. FIG. 1F also illustrates accessories 180 such as hydraulic systems which may contribute to the recapture of energy. Bidirectional accessory inverters 185 enable the conversion from DC to AC power and vice-versa. Electrical communication lines 180A and 185A are illustrated in FIG. 1F as well.

Figure 1G:
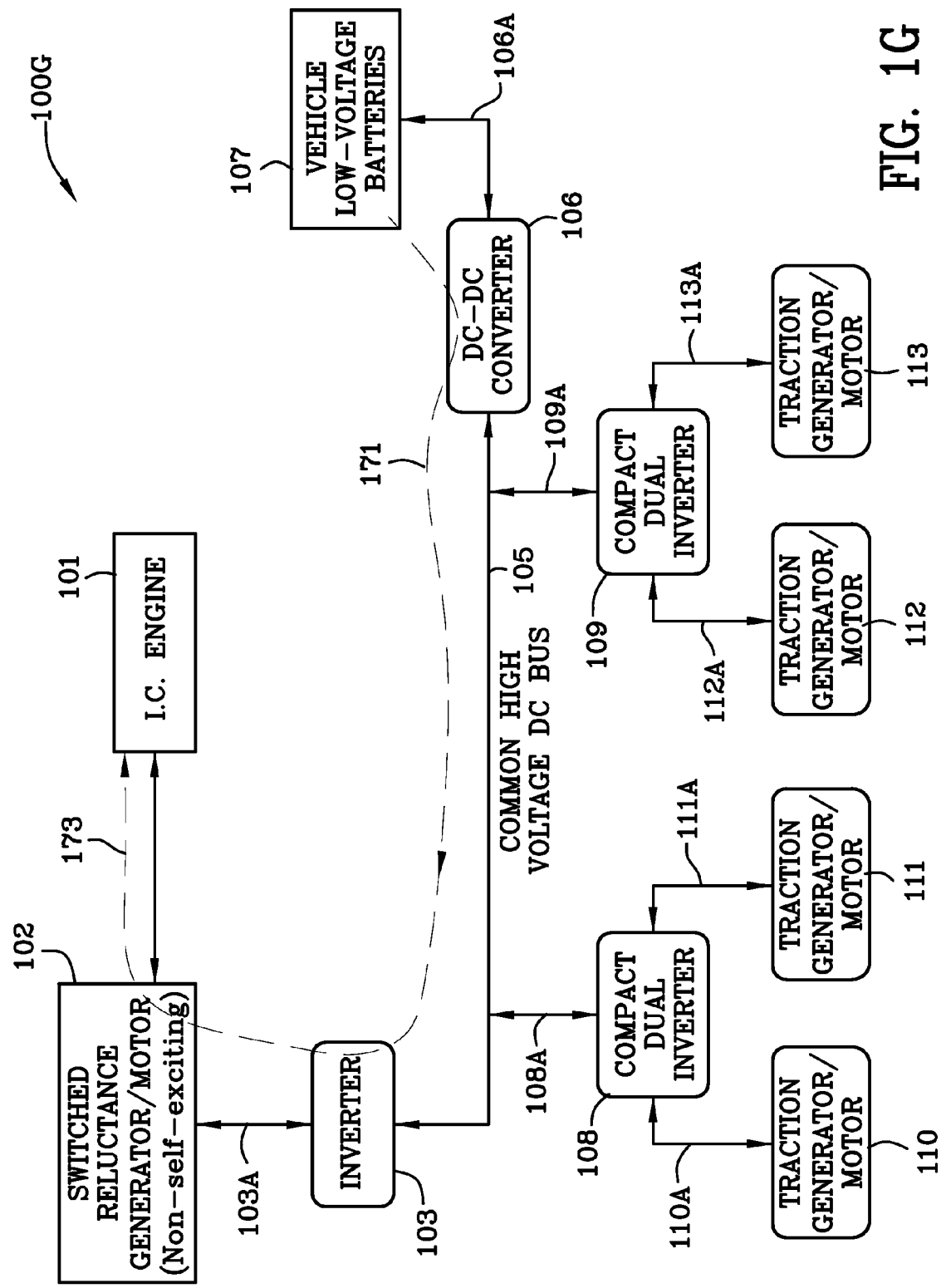
FIG. 1G is schematic illustration of a hybrid electric vehicle without an ultracapacitor bank wherein the low voltage batteries are used with an engine starter for starting the internal combustion engine.

FIG. 1G is schematic illustration 100G of a hybrid electric vehicle without an ultracapacitor bank wherein the low voltage batteries 107 are used with an engine starter for starting the internal combustion engine 101. Reference numeral 171 is a dashed line representing energy flow from the low voltage batteries 107 through the DC-DC converter 106 along the high voltage DC bus 105, through the power inverter 103 which inverts DC power to AC power for driving the non self-excited switched reluctance generator/motor 102 operating in the motor mode which mechanically drives and starts the internal combustion engine 101. Reference numeral 173 is a schematic arrow indicating energy supplied to the internal combustion engine 101 by way of a mechanical coupling for starting it.

FIG. 1H is a schematic illustration of a dual compact inverter having a synergistic advantage in that two inverters are able to share a cold plate, a DC-Link capacitor bank, bus bars, a housing, a high voltage connector and wiring, and some of the low voltage electronics. Sharing makes for compact efficient packaging.

The only physical I/O at the hybrid controller will be a pair of data links. All control will be exercised via these links. All sorts of control connections may be shown on data flow and control diagrams but they all exist only over the data links.

Referring to FIG. 3, an electronic controller 301 as set forth therein controls the operation of the hybrid electric vehicle. FIG. 3 is an electrical schematic 300 implementing the control strategy of FIGS. 2 and 2A. FIG. 3 illustrates the non self-excited switched reluctance generator 102 as a current source. FIG. 3 also illustrates the non self-excited switched reluctance generators 110, 111, 112, 113 as current sources. Load 320 is illustrated in FIG. 3 and represents the forces required for propulsion of the vehicle and for lifting the load with the bucket. Input from the hybrid data link 310 and input from the vehicle data link 311 are shown in FIG. 3.

Various algorithms may be employed in the controller 301. Further, the available energy from regeneration is continuously monitored and calculated by the controller and, therefore, the amount of energy output from the non self-excited generator 102 may be reduced. The controller 301 includes output $r_1$ which controls the non self-excited generator 102. The controller 301 includes output $r_2$ which controls the plurality of non self-excited AC traction generators 110, 111, 112, 113. Further, the available energy from regeneration is continuously monitored and calculated by the controller and, therefore, the amount of energy output from the non self-excited generator/motor 102 may be reduced according to the control signal output $r_1$. In other words, the outputs of the controller, namely, output $r_1$ and output $r_2$, are dynamic outputs which may continuously be changed based on the status of the hybrid electric vehicle. For instance, when the vehicle is moving and carrying a raised load in a bucket, then the vehicle possesses kinetic energy by virtue of its velocity and it also has potential energy by virtue of the raised load. Room can be made for the storage of the kinetic and potential energy in the ultracapacitor wherein the controller 301 reduces the output $r_1$ of the non self-excited switched reluctance generator/motor 102 operating in the generator mode in anticipation of the recovery of the kinetic and potential energy from the vehicle.

Still referring to FIG. 3, when the vehicle has been sitting for prolonged periods of time or when the vehicle is new, the battery 107 and the DC-DC converter 106 charge the ultracapacitor 104 to enable starting of the vehicle using the non self-excited switched reluctance generator/motor 102. The low voltage batteries used are capable of storing approximately 6 times the energy that the ultracapacitor can store. Referring to FIG. 4, for instance, reference numeral 409 indicates that approximately 1.2 MJ can be stored at 800 VDC across a 1200 Farad capacitor. If a 3000 Farad capacitor is used at 800 VDC, approximately 2.8 MJ can be stored. The two preferred low voltage batteries 107 can store approximately 7 MJ at 24 VDC.

Figure 5:
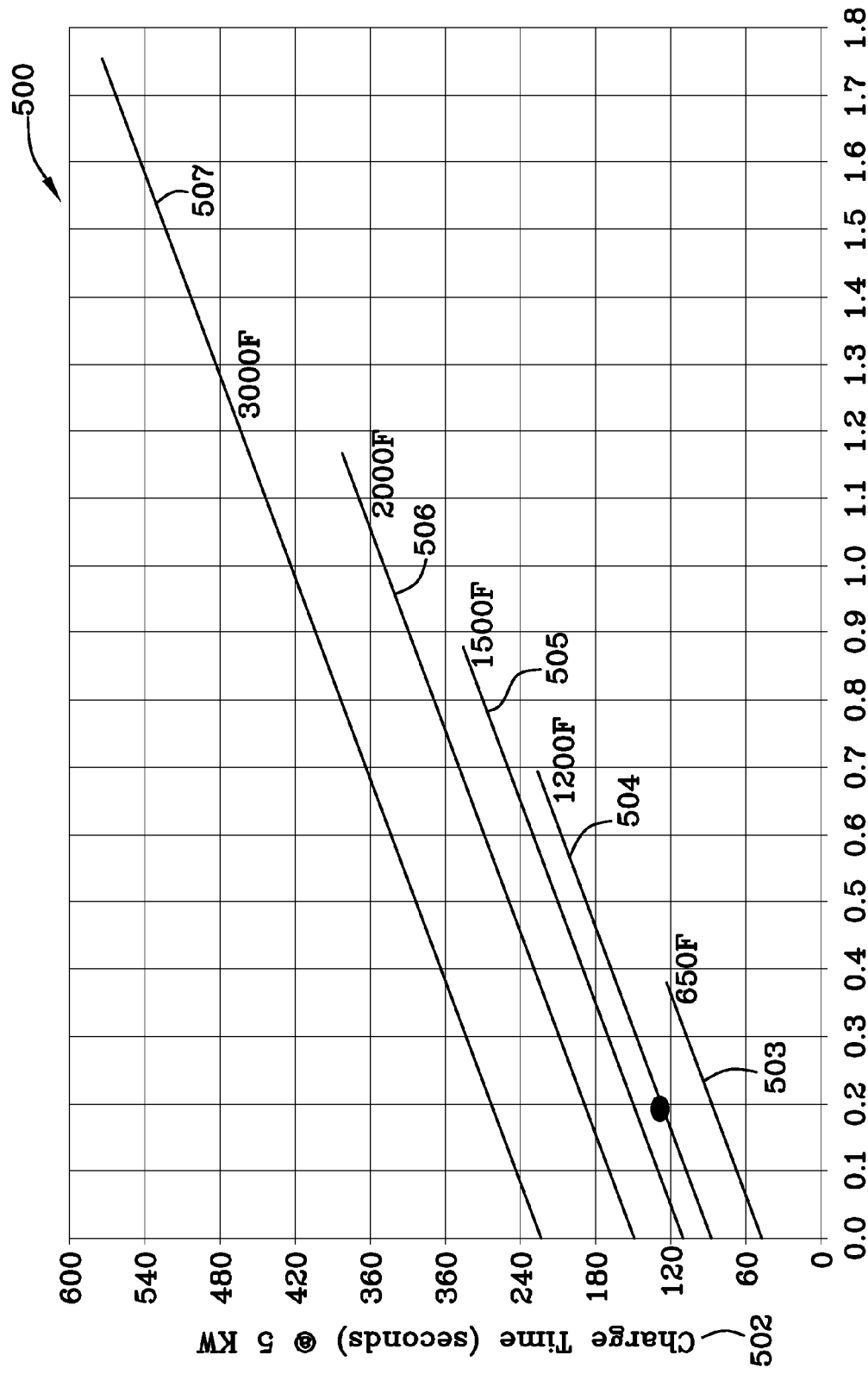
FIG. 5 is a graph illustrating ultracapacitor usable energy versus the charge time.

FIG. 5 is a graph 500 illustrating ultracapacitor usable energy 501 versus the charge time 502 with a charge rate of 5 kW. Reference numeral 504 illustrates the charge time of 1200 Farad capacitor string. Specifically, 0.2 MJ of usable energy is stored in ultracapacitor 104 in approximately 120 seconds and this amount of energy is more than sufficient for starting the internal combustion engine when the internal combustion engine is cold. If the engine is cold, usable energy of 200 kJ is necessary to start the engine. Reference numeral 503 illustrates the charge time of a 650 Farad capacitor string, reference numeral 505 illustrates the charge time of a 1500 Farad capacitor string, reference numeral 506 illustrates the charge time of a 2000 Farad capacitor string, and reference numeral 507 illustrates the charge time of a 3000 Farad capacitor string.

Figure 6:
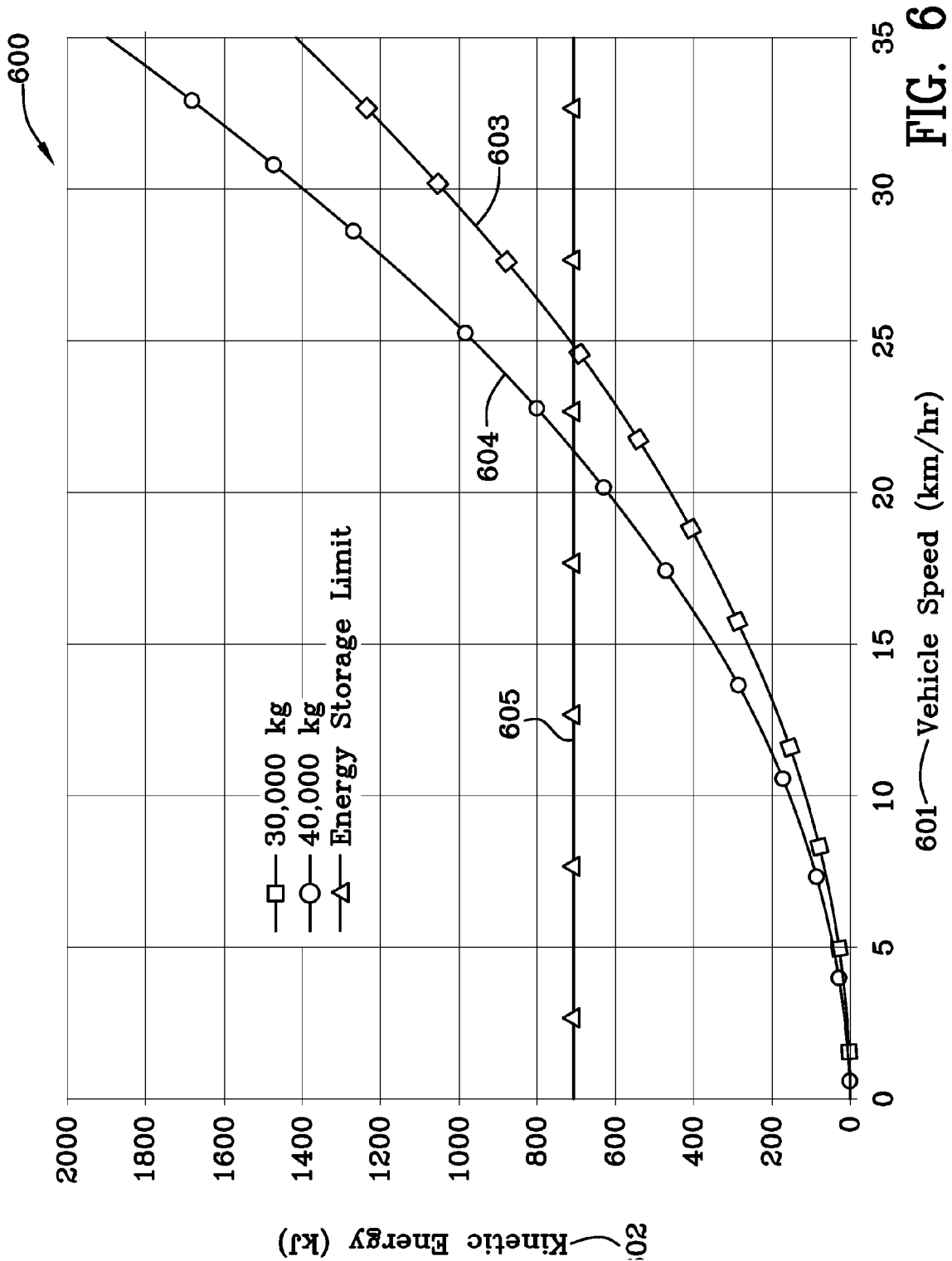
FIG. 6 is a graph illustrating vehicle speed versus kinetic energy for a 30,000 kg and a 40,000 kg vehicle.

FIG. 6 is a graph 600 illustrating vehicle speed 601 in km/hr versus kinetic energy 602 in kJ for a 30,000 kg and a 40,000 kg vehicle. Reference numeral 603 illustrates the plot for the 30,000 kg vehicle, and reference numeral 604 illustrates the plot for the 40,000 kg vehicle. Reference numeral 605 indicates that the kinetic energy storage limit is 700 kJ which is a large portion of the total stored energy of the capacitor as viewed in FIG. 4.

Figure 7:
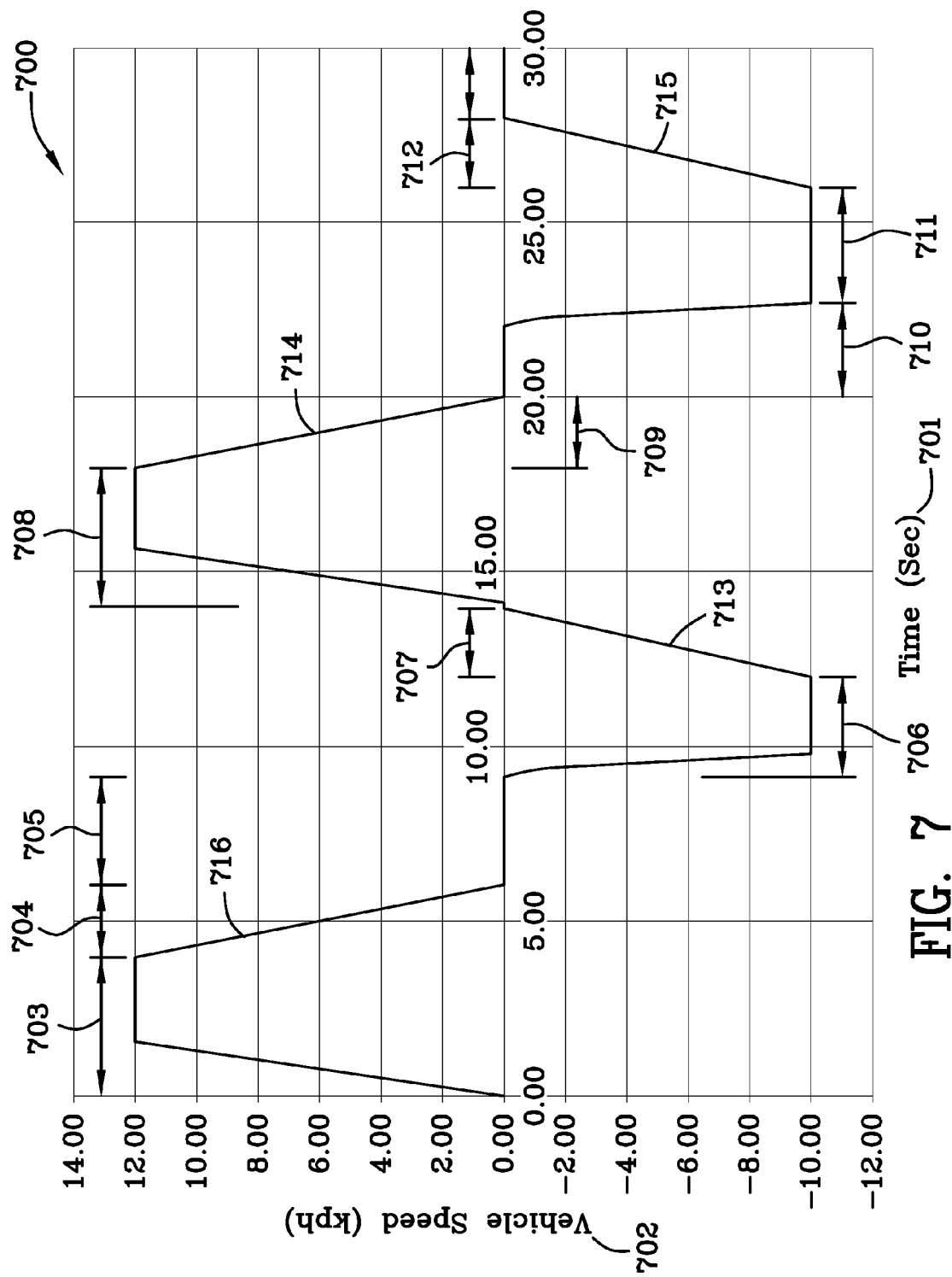
FIG. 7 is a graph illustrating vehicle speed, time and conditions for regeneration of energy.

FIG. 7 is a graph 700 illustrating vehicle speed 702, time of operation 701 and conditions for regeneration of energy. Reference numerals 713, 714, 715, and 716 represent periods of time for regeneration of energy. Specifically, reference numeral 703 represents a four (4) second interval of time. During a portion of this period of time 703, the vehicle accelerates and attains the speed of 12 km/h. Thereafter, reference numeral 704 represents a two (2) second interval of time when the vehicle is decelerating from 12 km/h to zero km/h. During this two (2) second period of time, energy is regenerated 716 as the vehicle is slowed from 12.0 km/h to 0.0 km/h. The regeneration of energy occurs when the wheels drive the non self-excited AC traction generators/motors 110, 111, 112, and 113 in the generator mode. Other types of traction generators/motors may be used as stated hereinabove.

Next, reference numeral 705 indicates zero speed for a period of three (3) seconds followed by rapid acceleration. Reference numeral is a four (4) second period of time 706. A portion of the time 706 is acceleration in the reverse direction until the vehicle attains 10 km/h. Once the vehicle attains 10 km/h in a period of one (1) second, it remains at 10 km/h for 3 seconds. Next, there is a two (2) second interval of time 707 when the vehicle is decelerating from 10 km/h to 0 km/h. During this two (2) second period of time 707, energy is regenerated 713 as the vehicle is slowed from 10 km/h to zero km/h. Next, there is a four (4) second period of time 708, two (2) seconds of which is a period of acceleration to 12 km/h. Once the vehicle attains the speed of 12 km/h it remains at 12 km/h for an additional two (2) seconds. Reference numeral 709 is a two (2) second interval of time when the vehicle is decelerating from 12 km/h to zero km/h. During this two (2) second period of time, energy is regenerated 714 as the vehicle is slowed from 12.0 km/h to 0.0 km/h.

Once the vehicle comes to rest, it remains at rest for two (2) additional seconds 710. Subsequently, the vehicle accelerates rapidly in the reverse direction for 0.5 seconds until it attains a speed of 10 km/h. Reference numeral 710 represents a two (2) second interval of time when the vehicle is not moving. Reference numeral 711 is a four (4) second interval of time when the vehicle is moving in the reverse direction at a speed of 10 km/h. Subsequently, once again, in a two (2) second interval of time 712, the vehicle decelerates from 10 km/h to zero km/h and energy is recaptured/regenerated 715.

Figure 8:
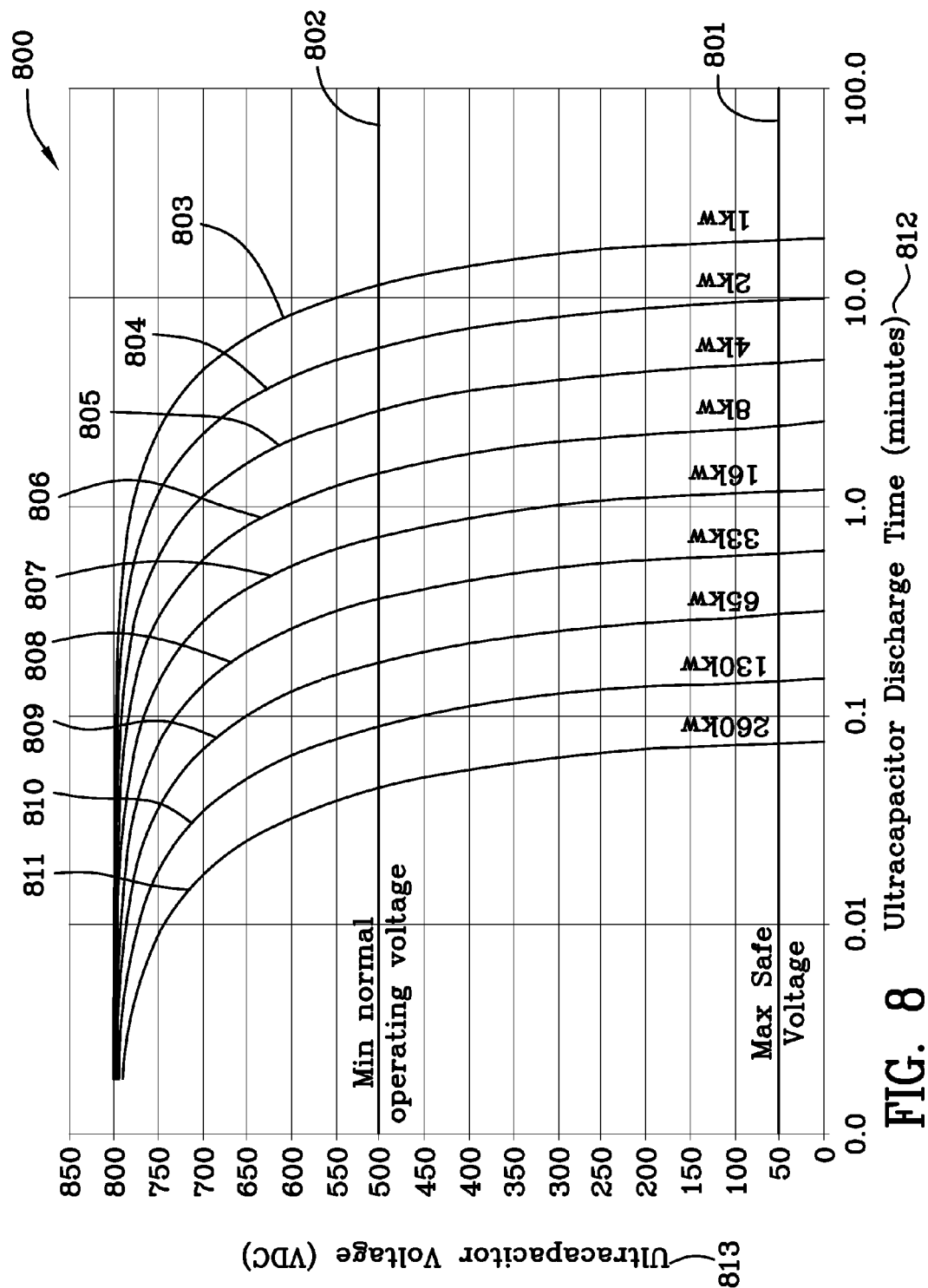
FIG. 8 is a semi-log graph of ultracapacitor voltage versus time for discharge for different power levels.

FIG. 8 is a semi-log graph 800 of ultracapacitor voltage 813 versus discharge time 812 for different power levels. Reference numeral 801 represents the maximum safe voltage and reference numeral 802 is the minimum normal operating voltage at which the ultracapacitor may be operated. Reference numeral 803 illustrates the discharge time from 800 VDC at 1 kW, reference numeral 804 illustrates the discharge time from 800 VDC at 2 kW, reference numeral 805 illustrates the discharge time from 800 VDC at 4 kW, reference numeral 806 illustrates the discharge time from 800 VDC at 8 kW, reference numeral 807 illustrates the discharge time from 800 VDC at 16 kW, reference numeral 808 illustrates the discharge time from 800 VDC at 33 kW, reference numeral 808 illustrates the discharge time from 800 VDC at 65 kW, reference numeral 809 illustrates the discharge time from 800 VDC at 65 kW, reference numeral 810 illustrates the discharge time from 800 VDC at 130 kW, and, reference numeral 811 illustrates the discharge time from 800 VDC at 260 kW.

REFERENCE NUMERALS

100A—schematic illustration of a hybrid electric vehicle illustrating, inter alia, the condition wherein the capacitor is charged from the 24-volt batteries after a prolonged shut-down of the hybrid electric vehicle;

100B—schematic illustration of a hybrid electric vehicle illustrating, inter alia, the condition wherein the capacitor is sufficiently charged and supplying energy to the non self-exciting switched reluctance generator/motor to start the internal combustion engine;

100C—schematic illustration of a hybrid electric vehicle illustrating, inter alia, the condition wherein the internal combustion engine is supplying power to the non self-exciting switched reluctance generator/motor operating in the generator mode supplying power to the ultra capacitor bank, the DC-DC converter and the 24 volt batteries;

100D—schematic illustration of a hybrid electric vehicle illustrating, inter alia, the condition wherein the internal combustion engine is supplying power to the non self-exciting switched reluctance generator/motor operating in the generator mode supplying power to the ultra capacitor bank, the dual inverters which supply power to the traction motors, and to the DC-DC converter supplying the low voltage batteries;

100E—schematic illustration of a hybrid electric vehicle illustrating, inter alia, the condition wherein the regenerative power is being supplied to the ultracapacitor bank, DC-DC converter, and the low-voltage batteries;

100E—schematic illustration of a hybrid electric vehicle illustrating, inter alia, the condition wherein the regenerative power is being supplied to the ultracapacitor bank and the non self-exciting switched reluctance generator/motor operating in the motor mode;

100G—schematic illustration of a hybrid electric vehicle without an ultracapacitor bank wherein the low voltage batteries are used with an engine starter for starting the internal combustion engine;

100H—schematic illustration of a dual compact inverter having a synergistic advantage in that two inverters are able to share a cold plate, a DC-Link capacitor bank, bus bars, a housing, a high voltage connector and wiring, and some of the low voltage electronics;

101—internal combustion engine;

101A—electrical communication between switched reluctance generator/motor 102 and the internal combustion engine 101;

102—non self-exciting switched reluctance generator/motor;

103—inverter AC to DC in the generator mode and DC to AC in the motor mode;

103A—electrical communication between non self-exciting generator/motor and the AC/DC inverter;

104—ultracapacitor bank;

104A—electrical communication between ultracapacitor bank 104 and high voltage DC bus;

105—a high voltage DC bus;

106—5 kW DC-DC converter interposed between vehicle low-voltage batteries and high voltage DC bus;

106A—electrical communication between vehicle low-voltage batteries and DC-DC converter;

107—vehicle low-voltage batteries, preferably 24 volt batteries;

108—compact dual DC/AC inverter driving two AC motors/gear reducers 110, 111 for driving the front wheels of the hybrid vehicle;

109—compact dual DC/AC inverter driving two AC motors/gear reducers 112, 113 for driving the rear wheels of the hybrid vehicle;

108A—electrical communication between high voltage DC bus 105 and compact dual inverter 108;

109A—electrical communication between high voltage DC bus 105 and compact dual inverter 109;

110, 111, 112, 113—non self-exciting switched reluctance generator/motor/gear reducers for driving wheels of the hybrid vehicle;

110A—electrical communication between compact dual DC/AC inverter 108 and traction motor 110;
111A—electrical communication between compact dual DC/AC inverter 108 and traction motor 111;
112A—electrical communication between compact dual DC/AC inverter 109 and traction motor 112;
113A—electrical communication between compact dual DC/AC inverter 109 and traction motor 113;
161—charge flow from low voltage batteries 107 to the DC-DC converter 106 to the ultracapacitor bank 104;
162G—charge flow from the non self-exciting switched reluctance generator/motor operating in the generator mode to: the DC/AC inverter 103, the ultracapacitor bank 104, the DC-DC converter 106, the low-voltage batteries 107, the compact dual inverters 108, 109, and the AC traction motors/gear reducers 110, 111, 112, and 113 for driving the wheels of the hybrid vehicle;
162M—charge flow from the ultracapacitor bank 104 to the DC/AC inverter 103 and to the non self-exciting switched reluctance generator/motor 102 operating in the motor mode;
162R—charge flow from the non self-exciting switched reluctance generator/motors 110, 111, 112, and 113 acting in the generator mode to the compact dual AC/DC inverters 108, 109, the high voltage DC bus, and the ultracapacitor bank 104;
163G—schematic arrow indicating rotational energy supplied by the crank shaft of the internal combustion engine 101 to the switched reluctance generator/motor operating in the generator mode;
163M—schematic arrow indicating rotational energy applied to the crank shaft of the internal combustion engine 101 by the switched reluctance generator/motor operating in the motor mode;
171—dashed line representing energy flow low voltage batteries through the DC-DC converter along the high voltage DC bus, through the power inverter which inverts DC power to AC power for driving the non self-excited switched reluctance generator/motor operating in the motor mode which mechanically drives and starts the internal combustion engine;
173—schematic arrow indicating energy supplied to the internal combustion engine 101;
180A—electrical communication with accessory
180—accessory
185—accessory inverters
185A—electrical communication with the accessory inverters
190—resistor bank;
190A—electrical communication line between the high voltage DC bus and the resistor bank 190;
190A—switch interposed in the electrical communication line 190A;
200, 200A—schematic of the control strategy of the hybrid electric vehicle;
203—is key in "start" position?;
203Y—key is in "start" position;
204—is the internal engine running?
204N—engine is not running;
204Y—engine is running;
205—is there sufficient energy in the ultracapacitor bank to start the engine?
205N—if there is not sufficient energy in the ultracapacitor bank to start the engine, then proceed to step 210 and transfer energy (charge) to the ultracapacitor to charge it preferably to at least 200V DC;
205Y—if there is sufficient energy in the ultracapacitor bank to start the engine, then proceed to step 203 and position the key in the start position;
207—calculate recoverable energy available, Er, based on the velocity of the machine and the operational state of the machine;
207A—communication of the calculated amount of recoverable energy to the next step 208;
208—is the recoverable energy plus the energy of the ultracapacitor bank less than or equal to the maximum permissible energy stored in the ultracapacitor bank Er+Ec<Euc max?
208N—if the recoverable energy plus the energy of the ultracapacitor bank is not less than or equal to the maximum permissible energy stored in the ultracapacitor bank, in other words, if the relationship Er+Ec<Euc max is not satisfied, then proceed to the next step 216, wherein the internal combustion engine is set to idle;
208Y—if the recoverable energy plus the energy of the ultracapacitor bank is less than or equal to the maximum permissible energy stored in the ultracapacitor bank, in other words the relationship Er+Ec<Euc max is satisfied, then proceed to the next step 214 and set the engine speed to the best brake specific fuel consumption and command maximum power from the non self-excited switched reluctance generator/motor 102 acting in the generator mode;
210—transfer energy from the low voltage batteries to the ultracapacitor over time using the DC-DC converter 106 such that the ultracapacitor is charged to 200 V DC;
211—line indicating communication of energy to the ultracapacitor bank;
214—set engine to the best brake specific fuel consumption (BSFC) speed and command maximum generator power from the switched reluctance generator/motor operating in the generator mode;
215—communication line to next step 235, is brake command present?
216—if the recoverable energy plus the energy stored in the ultracapacitor is not less than the maximum permissible energy in the ultracapacitor, then command the internal combustion engine to idle and command the output of the switched reluctance generator/motor operating in the generator mode to zero generator current;
216A—communication line signaling that the internal combustion engine has been commanded to idle and that the switched reluctance generator/motor operating in the generator mode is producing zero generator current;
217—has wait time expired, namely, the relationship Er+Euc<Euc max has not been satisfied after the wait time?
217Y—wait time has expired, proceed to step 218 and shut down the internal combustion engine;
218—shutdown internal combustion engine by defueling it;
221—is the brake command present?
221N—if the brake command is not present, then proceed to the next step 222, and determine if the DC Link>DC Link Min;
221Y—if the brake command is present, then proceed to the next step 227, and send a negative torque command to the non self-exciting switched reluctance generator/motors 110, 111, 112, and 113 acting in the generator mode to the compact dual AC/DC inverters 108, 109;
222—is DC Link>DC Link Min?
222N—if DC Link voltage is not greater than the DC link minimum voltage, then proceed to the next step 228 and send zero torque command to the switched reluctance generators/motors 110, 111, 112, 113 which drive the vehicle wheels proportional to the accelerator signal and within stability limits;

222Y—if the DC Link voltage is greater than the DC link minimum voltage, then proceed to the next step 223, and the read the accelerator command from the electronic controller;

223—read the accelerator command from the electronic controller;

224—read the shift selector;

225—is the speed of the vehicle is less than the maximum speed for the selector position?

225N—if the speed of the vehicle is not less than the maximum speed for the selector position, then proceed to the next step 228 and send zero torque command to the switched reluctance generators/motors 110, 111, 112, 113 which drive the vehicle wheels;

225Y—if the speed of the vehicle is less than the maximum speed for the selector position, proceed to the next step 226, is the machine in forward gear?

226—is the vehicle in forward gear?

226N—if the speed of the vehicle is not in the forward position, then proceed to the next step and send a negative torque command to the switched reluctance generators/motors 110, 111, 112, 113 which drive the vehicle wheels proportional to the accelerator signal and within stability limits to drive the vehicle in backward direction;

226Y—if the vehicle is in forward gear, proceed to the next step 229 and send the positive torque command to the switched reluctance generators/motors 110, 111, 112, 113 which drive the vehicle wheels proportional to the accelerator signal and within stability limits to drive the vehicle in the forward direction;

227—send negative torque command to the switched reluctance generators/motors 110, 111, 112, 113 which drive the vehicle wheels proportional to the brake command 225Y and within stability limits;

228—send zero torque command to the switched reluctance generators/motors 110, 111, 112, 113 which drive the vehicle wheels;

229—send a positive torque command to the switched reluctance generators/motors 110, 111, 112, 113 which drive the vehicle wheels;

230—send a negative torque command to the switched reluctance generators/motors 110, 111, 112, 113 which drive the vehicle wheels proportional to the accelerator signal and within stability limits;

300—electrical schematic implementing the control strategy of FIGS. 2 and 2A;

301—controller

310—input from hybrid data link

311—input from vehicle data link

400—graph illustrating the ultracapacitor voltage versus the ultracapacitor total stored energy;

401—ultracapacitor voltage;

402—ultracapacitor total stored energy (MJ);

403—650 Farad capacitor string;

404—1200 Farad capacitor string;

405—1500 Farad capacitor string;

406—2000 Farad capacitor string;

407—3000 Farad capacitor string;

408—500 volt abscissa mark;

409—800 volt abscissa mark;

410—1.3 MJ ordinate mark;

500—graph illustrating ultracapacitor usable energy versus the charge time;

501—usable energy bank;

502—charge time at 5 KW;

503—650 Farad capacitor string;

504—1200 Farad capacitor string;

505—1500 Farad capacitor string;

506—2000 Farad capacitor string;

507—3000 Farad capacitor string;

600—graph illustrating vehicle speed versus kinetic energy for a 30,000 kg and a 40,000 kg vehicle;

601—vehicle speed in km/h;

602—kinetic energy in kJ;

603—30,000 kg vehicle without a load;

604—40,000 kg vehicle including the load;

605—energy storage limit, 800V DC;

700—graph illustrating vehicle speed, time and conditions for regeneration of energy;

701—time;

702—vehicle speed km/h;

703—4 second interval of time where the vehicle accelerates and attains 12 km/h;

704—2 second interval of time when the vehicle is decelerating from 12 km/h to zero km/h;

705—2 second interval of time;

706—4 second interval of time when the vehicle is accelerating in the reverse direction;

707—2 second interval of time when the vehicle is decelerating from −10 km/h to zero km/h;

708—4 second interval of time where the vehicle accelerates and attains 12 km/h;

709—2 second interval of time when the vehicle is decelerating from 12 km/h to zero km/h;

710—2 second interval of time;

711—4 second interval of time when the vehicle is accelerating in the reverse direction;

712—2 second interval of time when the vehicle is decelerating from −10 km/h to zero km/h;

713, 714, 715, 716—shaded area representing regeneration of energy;

800—semi-log graph of ultracapacitor voltage versus time for different power levels;

801—minimum normal operating voltage;

802—maximum safe voltage;

803—1 kW;

804—2 kW;

805—4 kW;

806—8 kW;

807—16 kW;

808—33 kW;

808—65 kW;

809—130 kW;

810—130 kW;

811—260 kW;

812—time in minutes;

813—voltage, DC;

control of hybrid vehicle;

Those skilled in the art will recognize that the invention has been set forth by way of example only and that changes may be made to the invention without departing from the spirit and scope of the appended claims.

The invention claimed is:

1. A method for controlling a hybrid electric vehicle, comprising:

setting the maximum permissible energy content of an ultracapacitor bank;

setting the minimum high voltage DC bus voltage;

determining if there is sufficient energy in said ultracapacitor bank to start an internal combustion engine;

transferring energy using a DC-DC converter from a low voltage DC battery to said ultracapacitor bank if there is not sufficient energy in said ultracapacitor bank to start said internal combustion engine;

starting said internal combustion engine using a non self-excited generator/motor operating in a motor mode to start said internal combustion engine if there is sufficient energy in said ultracapacitor bank;

calculating recoverable energy in said hybrid electric vehicle;

calculating energy in said ultracapacitor bank of said hybrid electric vehicle;

determining if said calculated recoverable energy plus said ultracapacitor energy is less than a maximum permissible energy content of said ultracapacitor bank;

commanding said internal combustion engine to idle and commanding zero power generation from said non self-excited generator/motor operating in a generator mode if said calculated recoverable energy plus said ultracapacitor energy is not less than said maximum permissible energy content of said ultracapacitor bank and waiting a period of time while said internal combustion engine is idling with zero power generation from said non self-excited generator/motor operating in said generator mode and recalculating said calculated recoverable energy plus said ultracapacitor energy and redetermining if said calculated recoverable energy plus said ultracapacitor energy is less than a maximum permissible energy content of said ultracapacitor bank due to consumption of energy by said hybrid electric vehicle and if said recalculated recoverable energy plus said ultracapacitor energy is not less than a maximum permissible energy content of said ultracapacitor bank, then shutting down said internal combustion engine;

setting said internal combustion engine speed to the best brake specific speed and commanding maximum power from said non self-excited generator/motor operating in a generator mode if said calculated recoverable energy plus said ultracapacitor energy is less than said maximum permissible energy content of said ultracapacitor bank;

determining if a brake command is present;

sending a negative torque command to non self-excited traction motors/generators proportional to said brake command and within stability limits if said brake command is present;

determining if the high voltage DC bus voltage is greater than said high voltage DC bus minimum voltage if said brake command is not present;

sending a zero torque command to said non self-excited traction generators/motors if said high voltage DC bus voltage is not greater than said high voltage DC bus minimum voltage;

reading an accelerator command if said high voltage DC bus is greater than said high voltage DC bus minimum voltage;

determining if the vehicle speed is less than the maximum permissible speed;

sending a zero torque command to said non self-excited traction generators/motors if vehicle speed is not less than the maximum permissible speed;

sending a positive torque command proportional to the accelerator signal within stability limits to said non self-excited traction generators/motor if said shift selector is in forward gear; and, sending a negative torque command proportional to the accelerator signal within stability limits to said non self-excited traction generators/motors if said shift selector is not in forward gear.

2. A method for controlling a hybrid electric vehicle as claimed in claim 1 wherein said non self-excited traction generators/motors are switched reluctance machines.

3. A method for controlling a hybrid electric vehicle as claimed in claim 1 wherein said non self-excited generator/motor operating for starting said internal combustion engine is a switched reluctance machine.

4. A method for controlling a hybrid electric vehicle as claimed in claim 1 wherein said step of commanding said internal combustion engine to idle and commanding zero power generation from said non self-excited generator/motor operating in a generator mode if said calculated recoverable energy plus said ultracapacitor energy is not less than said maximum permissible energy content of said ultracapacitor bank and waiting a period of time while said internal combustion engine is idling with zero power generation from said non self-excited generator/motor operating in said generator mode and recalculating said calculated recoverable energy plus said ultracapacitor energy and redetermining if said calculated recoverable energy plus said ultracapacitor energy is less than a maximum permissible energy content of said ultracapacitor bank due to consumption of energy by said hybrid electric vehicle and if said recalculated recoverable energy plus said ultracapacitor energy is not less than a maximum permissible energy content of said ultracapacitor bank, then shutting down said internal combustion engine.

5. A method for controlling a hybrid electric vehicle as claimed in claim 1 wherein said step of commanding said internal combustion engine to idle and commanding zero power generation from said non self-excited generator/motor operating in a generator mode if said calculated recoverable energy plus said ultracapacitor energy is not less than said maximum permissible energy content of said ultracapacitor bank and waiting a period of time while said internal combustion engine is idling with zero power generation from said non self-excited generator/motor operating in said generator mode and recalculating said calculated recoverable energy plus said ultracapacitor energy and redetermining if said calculated recoverable energy plus said ultracapacitor energy is less than a maximum permissible energy content of said ultracapacitor bank due to consumption of energy by said hybrid electric vehicle and if said recalculated recoverable energy plus said ultracapacitor energy is not less than a maximum permissible energy content of said ultracapacitor bank, then shutting down said internal combustion engine is performed in conjunction with said dual compact inverters discharging some energy in said ultracapacitor bank into windings of said non self-excited traction generators/motors without motion either by operating at sufficiently low enough power to avoid motion or by operating said non self-excited traction generators/motors with opposing torques to enable safe operation of said vehicle.

6. A method for controlling a hybrid electric vehicle as claimed in claim 1 wherein said ultracapacitor bank is driven to a predetermined maximum state of charge prior to shutdown of said internal combustion engine for rapid engine starting without need to rely on pre-charging from said vehicle low-voltage DC battery.

7. A hybrid electric vehicle, comprising:
a high voltage DC bus;
an internal combustion engine;
said internal combustion engine mechanically coupled to a non self-excited switched reluctance motor/generator;

said non self-excited switched reluctance motor/generator operates as a generator supplying electrical power in a generator mode;

said non self-excited switched reluctance motor/generator operates as a motor receiving electrical power in a motor mode;

said non self-excited switched reluctance generator/motor coupled to an inverter, said inverter bi-directionally conveys power between said high voltage DC bus and said non self-excited switched reluctance generator/motor;

a first front AC traction motor/generator for driving a first front wheel, said first front traction motor/generator being a non self-excited switched reluctance motor/generator, said first front traction motor/generator provides propulsion and/or regenerative braking;

a second front AC traction motor for driving a second front wheel, said second front traction motor/generator being a non self-excited switched reluctance motor/generator, said second front traction motor/generator provides propulsion and/or regenerative braking;

a first rear AC traction motor/generator for driving a first rear wheel, said first rear traction motor/generator being a non self-excited switched reluctance motor/generator, said first rear traction motor/generator provides propulsion and/or regenerative braking;

a second rear AC traction motor/generator for driving a second rear wheel, said second rear traction motor/generator being a non self-excited switched reluctance motor/generator, said second rear traction motor/generator provides propulsion and/or regenerative braking;

a first compact dual inverter and a second compact dual inverter;

said first compact dual inverter in electrical communication with said high voltage DC bus;

said first compact dual inverter converts DC power from said high voltage DC bus into AC power for driving said first front AC traction motor/generator and said first front wheel;

said first compact dual inverter converts DC power from said high voltage DC bus into AC power for driving said second front AC traction motor/generator and said second front wheel;

said second compact dual inverter in electrical communication with said high voltage DC bus;

said second compact dual inverter converts DC power from said high voltage DC bus into AC power for driving said first rear AC traction motor/generator and said first rear wheel;

said second compact dual inverter converts DC power from said high voltage DC bus into AC power for driving said second rear AC traction motor/generator and said second rear wheel;

an ultracapacitor bank, said ultracapacitor bank electrically coupled to said high voltage DC bus;

said ultracapacitor bank stores regenerative energy from said first compact dual inverter supplied by said first and second front AC traction motors/generators operating in a regenerative mode;

said ultracapacitor bank stores regenerative energy from said second compact dual inverter supplied by said first and second rear AC traction motors/generators operating in a regenerative mode;

said ultracapacitor bank stores energy from said inverter coupled to said non self-excited switched reluctance generator/motor when said non self-excited switched reluctance generator/motor is operating in said generator mode;

said ultracapacitor bank supplies energy to said inverter coupled to said non self-excited switched reluctance generator/motor when said non self-excited switched reluctance generator/motor is operating in said motor mode to start said internal combustion engine;

a conventional low voltage system with at least one 12 or 24 volt battery;

a bidirectional DC-DC converter, said DC-DC converter steps said voltage of said battery up and conveys power between said 12 or 24 volt battery and said ultracapacitor bank to pre-charge said ultracapacitor bank to start said internal combustion engine; and, said bidirectional DC-DC converter steps said voltage of said high voltage DC bus down to maintain the state of charge of said 12 or 24 volt battery after said internal combustion engine is started.

8. A hybrid electric vehicle as claimed in claim 7, further comprising:

a resistor bank, said resistor bank consumes excess regenerative energy from said non self-excited AC traction generators/motors operating in said regenerative braking mode.

9. A hybrid electric vehicle as claimed in claim 7 in which said non self-excited switched reluctance motor/generator coupled to said internal combustion engine operating in said motor mode is used to dissipate excess kinetic energy from the vehicle by back driving said engine while operating an engine compression brake.

10. A hybrid electric vehicle as claimed in claim 7, wherein said non self-excited switched reluctance generator/motor is the primary source of electrical energy for the vehicle.

11. A hybrid electric system, comprising:

an internal combustion engine;

a non self-exciting AC generator/motor;

said non self-exciting AC generator/motor operates in either a generator mode or a motor mode;

a high voltage DC bus;

an ultracapacitor bank, said ultracapacitor bank connected full time across said high voltage DC bus;

an AC-DC inverter for converting the AC power from said non self-exciting AC generator/motor to DC power for supply to said high voltage DC bus and said ultracapacitor bank;

a low voltage DC battery;

means for charging said ultracapacitor bank from said conventional low-voltage DC battery to provide initial excitation energy to said non self-exciting generator/motor operating in said motor mode to start said internal combustion engine; and, said non self-excited generator/motor is operated in said motor mode to back drive said internal combustion engine and an associated engine brake in order to dissipate excessive regenerative braking energy.

12. A hybrid electric system, as claimed in claim 11 in which said ultracapacitor bank is charged with sufficient energy from said low voltage battery such that said non self-excited generator/motor can be used in said motor modes to start said internal combustion engine thus replacing the conventional low-voltage engine starter.

13. A hybrid electric system, as claimed in claim 11 wherein said means used to charge said ultracapacitor is a bi-directional DC-DC converter which maintains the state of charge of said low-voltage battery thus eliminating the need for a conventional low-voltage alternator.

14. A hybrid electric system as claimed in claim 11, wherein said non self-excited generator/motor is a switched reluctance machine.

15. A hybrid electric system, comprising:
an internal combustion engine;
a non self-exciting AC generator/motor;
said non self-exciting AC generator/motor operates in either a generator mode or a motor mode;
a high voltage DC bus;
an ultracapacitor bank, said ultracapacitor bank connected full time across said high voltage DC bus;
an AC-DC inverter for converting the AC power from said non self-exciting AC generator/motor to DC power for supply to said high voltage DC bus and said ultracapacitor bank;
a low voltage DC battery;
means for charging said ultracapacitor bank from said conventional low-voltage vehicle DC battery to provide initial excitation energy to said non self-exciting generator/motor operating in said motor mode to start said internal combustion engine;
dual compact inverters;
a plurality of wheels;
a plurality of non self-excited traction generators/motors each interconnected with a respective one of said plurality of wheels;
said dual compact inverters are connected across said ultracapacitor bank;
said dual compact inverters are bidirectional DC-AC inverters;
said dual compact inverters transfer energy to and from said ultracapacitor bank and to and from said non self-excited traction generators/motors; and,
one or more of said dual compact inverters discharge some energy in said ultracapacitor bank into the windings of said non self-excited traction generators/motors without motion either by operating at sufficiently low enough power to avoid motion or by operating said non self-excited traction generators/motors with opposing torques to enable safe operation of said system.

16. A hybrid electric system, comprising:
an internal combustion engine;
a non self-exciting AC generator/motor;
said non self-exciting AC generator/motor operates in either a generator mode or a motor mode;
a high voltage DC bus;
an ultracapacitor bank, said ultracapacitor bank connected full time across said high voltage DC bus;
an AC-DC inverter for converting the AC power from said non self-exciting AC generator/motor to DC power for supply to said high voltage DC bus and said ultracapacitor bank;
a low voltage DC battery;
means for charging said ultracapacitor bank from said conventional low-voltage DC battery to provide initial excitation energy to said non self-exciting generator/motor operating in said motor mode to start said internal combustion engine; and,
said ultracapacitor bank is driven to a predetermined maximum state of charge prior to engine shutdown in order to provide for rapid engine starting without need to rely on pre-charging from said vehicle low-voltage DC battery under normal operating conditions.

* * * * *

UNITED STATES PATENT AND TRADEMARK OFFICE
CERTIFICATE OF CORRECTION

PATENT NO. : 9,174,525 B2  Page 1 of 1
APPLICATION NO. : 14/038740
DATED : November 3, 2015
INVENTOR(S) : Caron It is certified that error appears in the above-identified patent and that said Letters Patent is hereby corrected as shown below:

In the specification,

Col. 16, line 7, after "to" delete "with," and insert --wit,-- therefor.

Col. 16, line 15, after "to" delete "with," and insert --wit,-- therefor.

Col. 20, line 20, delete "100E" and insert --100F-- therefor.

Signed and Sealed this
Eighth Day of March, 2016

Michelle K. Lee
*Director of the United States Patent and Trademark Office*